(12) United States Patent
Hill et al.

(10) Patent No.: US 11,621,841 B2
(45) Date of Patent: Apr. 4, 2023

(54) SYSTEM AND METHOD FOR SECURE END-TO-END ELECTRONIC COMMUNICATION USING A PRIVATELY SHARED TABLE OF ENTROPY

(71) Applicant: Real Random IP, LLC, Tampa, FL (US)

(72) Inventors: Douglass A. Hill, Marco Island, FL (US); Henry R. Tumblin, Castine, ME (US)

(73) Assignee: Real Random IP, LLC, St. Petersburg, FL (US)

( * ) Notice: Subject to any disclaimer, the term of this patent is extended or adjusted under 35 U.S.C. 154(b) by 0 days.

(21) Appl. No.: 17/385,817

(22) Filed: Jul. 26, 2021

(65) Prior Publication Data
US 2022/0337566 A1     Oct. 20, 2022

Related U.S. Application Data

(63) Continuation of application No. 17/382,282, filed on Jul. 21, 2021.
(Continued)

(51) Int. Cl.
  *H04L 29/06* (2006.01)
  *H04L 9/08* (2006.01)
  (Continued)

(52) U.S. Cl.
  CPC .......... *H04L 9/0869* (2013.01); *G06F 21/602* (2013.01); *G06F 21/6245* (2013.01);
  (Continued)

(58) Field of Classification Search
  CPC ............. H04L 63/0428; H04L 63/0435; H04L 63/0442; H04L 63/045; H04L 63/0457
  (Continued)

(56) References Cited

U.S. PATENT DOCUMENTS

| 4,227,253 A | 10/1980 | Ehrsam et al. |
| 6,343,361 B1 | 1/2002 | Nendell et al. |

(Continued)

FOREIGN PATENT DOCUMENTS

EP     3701664 A1     9/2020

*Primary Examiner* — Jeffrey C Pwu
*Assistant Examiner* — Nega Woldemariam
(74) *Attorney, Agent, or Firm* — Morgan, Lewis & Bockius LLP

(57) ABSTRACT

A method performed at a first electronic device includes: (i) storing a privacy table that comprises random numbers at the first electronic device, (ii) transmitting the privacy table to a second electronic device over an encrypted channel, (iii) receiving a first message for transmission to the second electronic device, (iv) generating a map based on the privacy table, (v) generating a primary key based on the map and the privacy table, and (vi) encrypting the first message using the primary key to form an encrypted first message. The method also includes (vii) transmitting the map and the encrypted first message to the second electronic device, thereby enabling the second electronic device to decrypt the encrypted first message by recreating the primary key based on the map and the privacy table and decrypting the encrypted first message using the recreated primary key.

14 Claims, 19 Drawing Sheets

Related U.S. Application Data

(60) Provisional application No. 63/175,548, filed on Apr. 15, 2021.

(51) Int. Cl.
*H04L 9/40* (2022.01)
*G06F 21/60* (2013.01)
*G06F 21/62* (2013.01)

(52) U.S. Cl.
CPC ........ *H04L 9/0894* (2013.01); *H04L 63/0428* (2013.01); *H04L 63/0435* (2013.01)

(58) Field of Classification Search
USPC ......................................................... 713/164
See application file for complete search history.

(56) References Cited

U.S. PATENT DOCUMENTS

| | | |
|---|---|---|
| 6,668,321 B2 | 12/2003 | Nendell et al. |
| 6,904,526 B1 | 6/2005 | Hongwei |
| 7,003,667 B1 | 2/2006 | Slick et al. |
| 10,601,443 B1 | 3/2020 | Tourani et al. |
| 2002/0186846 A1 | 12/2002 | Nyberg et al. |
| 2004/0266449 A1* | 12/2004 | Smetters ............... H04W 12/04 455/452.1 |
| 2008/0292098 A1 | 11/2008 | Akima et al. |
| 2012/0321077 A1 | 12/2012 | Shiota et al. |
| 2013/0329886 A1 | 12/2013 | Kipnis et al. |
| 2015/0365424 A1 | 12/2015 | Pelleter |
| 2018/0054305 A1 | 2/2018 | Djakovic et al. |
| 2018/0248691 A1 | 8/2018 | Henderson et al. |
| 2019/0097789 A1* | 3/2019 | Rangayyan ........... G06F 21/602 |
| 2019/0207758 A1* | 7/2019 | Cambou ................... H04L 9/30 |
| 2020/0351102 A1 | 11/2020 | Rocquelay et al. |

\* cited by examiner

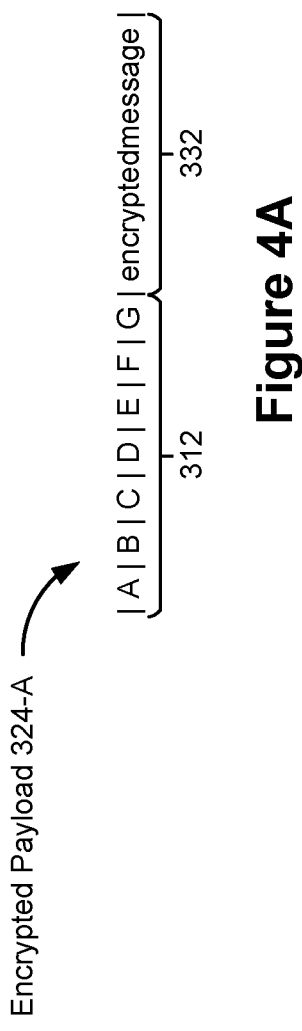
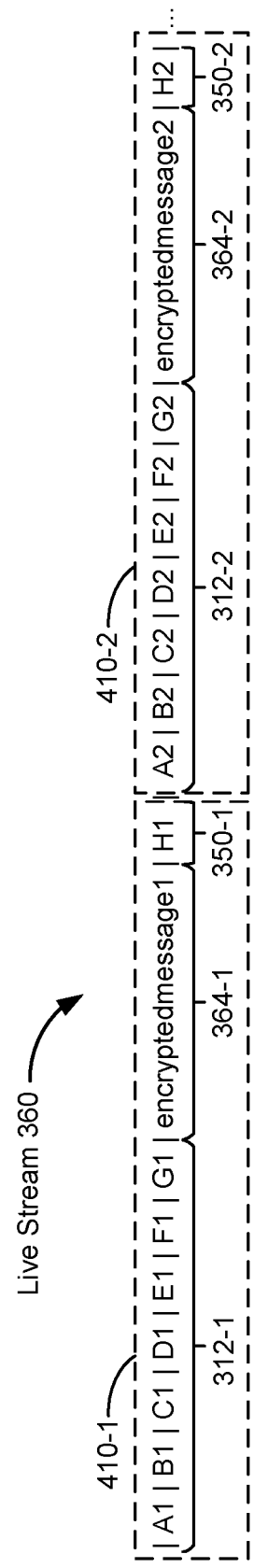

SYSTEM AND METHOD FOR SECURE END-TO-END ELECTRONIC COMMUNICATION USING A PRIVATELY SHARED TABLE OF ENTROPY

CROSS REFERENCE TO RELATED APPLICATIONS

This application is a continuation of U.S. patent application Ser. No. 17/382,282, filed Jul. 21, 2021, entitled "SYSTEM AND METHOD FOR SECURE END-TO-END ELECTRONIC COMMUNICATION USING A PRIVATELY SHARED TABLE OF ENTROPY," which claims priority to U.S. Provisional Patent Application No. 63/175,548, filed Apr. 15, 2021, entitled "SYSTEM AND METHOD FOR SECURE END-TO-END ELECTRONIC COMMUNICATION USING A PRIVATELY SHARED TABLE OF ENTROPY," each of which is incorporated by reference herein in its entirety.

TECHNICAL DATA FIELD

This application relates generally to secure communication, including but not limited to secure communication using a privately shared table of entropy that includes true random numbers.

BACKGROUND

Random number generation is a critical component of computer and Internet security and enables encrypted end-to-end communication that is truly secure. Problems with security systems that utilize pseudorandom number generators (e.g., seeded computational algorithms or deterministic logic) are well known. For example, an entire random sequence generated by a pseudorandom number generator can be reproduced if the seed value is known, allowing an unauthorized party to breach the security of a system. The only way to assure the integrity and security of a computerized network is to utilize keys that are created from truly randomly generated numbers (e.g., true random numbers).

SUMMARY

Accordingly, there is a need for secure communication methods and systems that can efficiently and securely transmit information between devices (e.g., electronic devices) within the system. The embodiments herein address the problem of providing truly secure networks by utilizing a privately shared table of entropy to encrypt and decrypt data transmitted between devices of the secure communication network. The table of entropy includes real (e.g., true) random numbers. In some embodiments, the random numbers are generated using an electro-mechanical device that can fit in traditional data centers and the generated random numbers can be used to provide Entropy As A Service (EAAS). For example, EAAS can provide random numbers for generating table(s) of entropy that can be privately shared between devices of a secure communication network (e.g., secure communication system) for secure communication and transmission of information (e.g., data). In some embodiments, EAAS may be provided from a security provider to a third party (e.g., a third party service provider or third party server that hosts a network or a service) to ensure secure data transmission between devices.

According to some embodiments, a method is performed at a first electronic device (e.g., sender device). The first electronic device stores a privacy table that contains random numbers. The first electronic device transmits the privacy table to a second electronic device (e.g., receiver device) over an encrypted channel. Later, the first electronic device receives a first message for transmission to the second electronic device. The first electronic device generates a map (e.g., encoding/decoding map) based on the privacy table, then generating a primary key (e.g., encryption key) based on the map and the privacy table. The first electronic device encrypts the first message using the primary key to form an encrypted first message. The first electronic device transmits the map and the encrypted first message to the second electronic device, thereby enabling the second electronic device to decrypt the encrypted first message by recreating the primary key based on the map and the privacy table and decrypting the encrypted first message using the recreated primary key.

In some embodiments, the first electronic device receives a second message for transmission to the second electronic device, and generates a new map, which is distinct from the map. The first electronic device generates a new primary key based on the new map and the privacy table. The new primary key is distinct from the earlier primary key. The first electronic device encrypts the second message using the new primary key to form an encrypted second message. The first electronic device transmits the new map and the encrypted second message to the second electronic device, thereby enabling the second electronic device to decrypt the encrypted second message by recreating the new primary key based on the new map and the privacy table and decrypting the encrypted second message using the recreated new primary key.

In some embodiments, the encrypted second message includes (e.g., comprises) a new privacy table generated to replace the privacy table. In such cases, the method further includes, after transmitting the new map and the encrypted second message to the second electronic device, replacing the privacy table with the new privacy table.

In some embodiments, generating the map includes selecting a location in the privacy table, selecting a read direction, and generating the map based on values stored in the privacy table starting at the selected location and reading values stored in the privacy table in accordance with the selected read direction.

In some embodiments, the privacy table is transmitted at a first time and the map and encrypted first message are transmitted at a second time subsequent to the first time.

In some embodiments, the first electronic device is a remote sensing station, the second electronic device is a medical device, and the encrypted first message includes medical data.

In some embodiments, transmitting the map and the encrypted first message to the second electronic device includes prepending the map to the encrypted first message to generate a payload that is transmitted from the first electronic device to the second electronic device.

In some embodiments, the encrypted first message is included in a live stream and generating the payload includes appending an optional initialization vector to the encrypted first message.

In some embodiments, the encrypted first message and the encrypted second message are included in a live stream. In such cases, encrypting the first message, by the first electronic device, includes using the primary key, and encrypting the second message, by the first electronic device, includes using the new primary key to form the encrypted second message.

In some embodiments, when the encrypted first message and the encrypted second message are included in a live stream, the first electronic device uses an initialization vector in combination with the primary key to form the encrypted first message, and the first electronic device uses an initialization vector in combination with the new primary key to form the encrypted second message. In some embodiments, the initialization vector used to form the encrypted second message is a new initialization vector that is distinct from the initialization vector used to form the encrypted first message. Alternatively, the encrypted first message and the encrypted second message may be formed using the same initialization vector. In some embodiments, the first electronic device transmits the initialization vector with the map and the encrypted first message to the second electronic device; after transmitting the initialization vector, the map, and the encrypted first message to the second electronic device, the first electronic device updates the initialization vector to form the new initialization vector and transmits the new initialization vector with the new map and the encrypted second message to the second electronic device.

In some embodiments, the map includes two or more of (e.g., a plurality of): a random value corresponding to a starting point within the privacy table, a value corresponding to a horizontal offset from the starting point within the privacy table, a value corresponding to a horizontal read direction from the starting point within the privacy table, a value corresponding to a vertical offset from the starting point within the privacy table, a value corresponding to a vertical read direction from the starting point within the privacy table, a value corresponding to a size (e.g., a permutation of a size) of the privacy table in a horizontal direction, a value corresponding to a size (e.g., a permutation of a size) of the privacy table in a vertical direction, a value corresponding to a starting point within the privacy table (e.g., within the permutation), and a length of a challenge string that is used to generate the primary key.

In some embodiments, generating the primary key based on the map and the privacy table includes generating a challenge string based on the map and applying a digest function to the challenge string to form the primary key.

According to some embodiments, a method performed at an electronic device (e.g., receiver device) includes receiving a privacy table at the electronic device. The privacy table is transmitted from another electronic device (e.g., sender device) over an encrypted channel and the privacy table comprises random numbers. The method also includes storing the privacy table at the electronic device, receiving a map (e.g., encoding/decoding map) and an encrypted first message from the other electronic device, creating a primary key using the map and the privacy table, decrypting the encrypted first message using the primary key to form a decrypted first message, and reading the decrypted first message.

In some embodiments, the method further includes receiving a new map and an encrypted second message. The new map is distinct from the map. The method also includes creating a new primary key (e.g., decryption key) using the new map and the privacy table, decrypting the encrypted second message using the new primary key to form a decrypted second message, and reading the decrypted second message.

In some embodiments, the encrypted first message and the encrypted second message are included in a live stream.

In some embodiments, the electronic device receives an initialization vector from the other electronic device and receives a new initialization vector, distinct from the initialization vector, from the other electronic device. In such cases, decrypting the encrypted first message, by the electronic device, includes using the primary key and the initialization vector to form a decrypted first message. Decrypting the encrypted second message, by the electronic device, includes using the new primary key and the new initialization vector to form a decrypted first message.

In some embodiments, the encrypted second message comprises a new privacy table that is distinct from the privacy table. In such cases, the method further includes, after decrypting the encrypted second message using the new primary key to form a decrypted second message, replacing the privacy table with the new privacy table.

In some embodiments, the electronic device (e.g., receiver device) is a medical device, the other electronic device (e.g., sender device) is a remote sensing station, and the encrypted first message includes medical data.

In accordance with some embodiments, a non-transitory computer-readable storage medium includes one or more processors, memory, and one or more programs. The one or more programs are stored in the memory and configured to be executed by the one or more processors. The one or more programs include instructions for performing the operations of the method described above for the server system. In accordance with some embodiments, a non-transitory computer-readable storage medium stores instructions that, when executed by the non-transitory computer-readable storage medium, cause the server system to perform the operations of the method described above.

Thus, methods and systems disclosed herein provide a secure communication network that utilizes table(s) of entropy that include truly random numbers.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures and specification.

FIG. 4A illustrates an example of an encrypted payload, according to some embodiments.

FIG. 4B illustrates an example of a live stream, according to some embodiments.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

As used herein, the term "if" means "when" or "upon" or "in response to determining" or "in response to detecting" or "in accordance with a determination that," depending on the context. Similarly, the phrase "if it is determined" or "if [a stated condition or event] is detected" means "upon determining" or "in response to determining" or "upon detecting [the stated condition or event]" or "in response to detecting [the stated condition or event]" or "in accordance with a determination that [a stated condition or event] is detected," depending on the context.

It will also be understood that, although the terms first and second are, in some instances, used herein to describe various elements, these elements should not be limited by these terms. These terms are used only to distinguish one element from another.

Figure 1A:
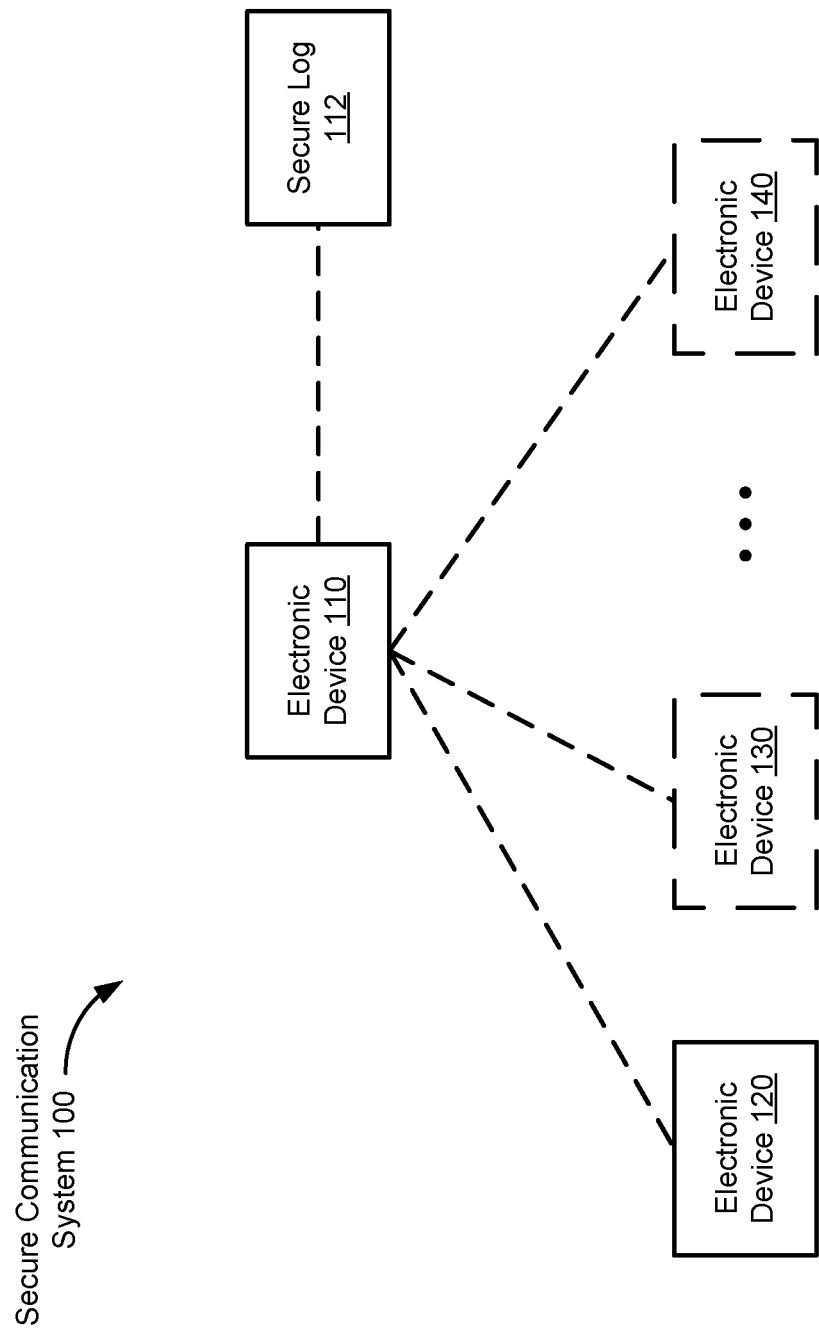
FIG. 1A illustrates a secure communication system, according to some embodiments.

FIG. 1 is a block diagram of a secure communication system 100 (e.g., a secure communication network 100), according to some embodiments. The secure communication system 100 includes a plurality of devices (e.g., electronic devices, such as devices 110, 120, 130, and 140) that can communicate with each other securely. The secure communication system 100 includes an electronic device 110, an electronic device 120, and a secure log 112. In some embodiments, the secure communication system 100 includes additional devices, such as electronic devices 130 and 140, that can communicate with other devices in the secure communication system 100. In this example, the electronic device 110 is shown as being able to communicate with a plurality of devices (e.g., devices 120, 130, or 140).

In some embodiments, data transmitted to and/or from the electronic device 110 is stored in a secure log 112. In some embodiments, the secure log 112 is a blockchain ledger that is used to record all data that is sent and/or received at the electronic device 110. In some embodiments, the secure log 112 is a permissioned blockchain network. In some embodiments, the secure log 112 is stored at another electronic device that is distinct from the electronic device 110. For example, the secure log 112 may be stored at a computer system or server system.

Figure 1B:
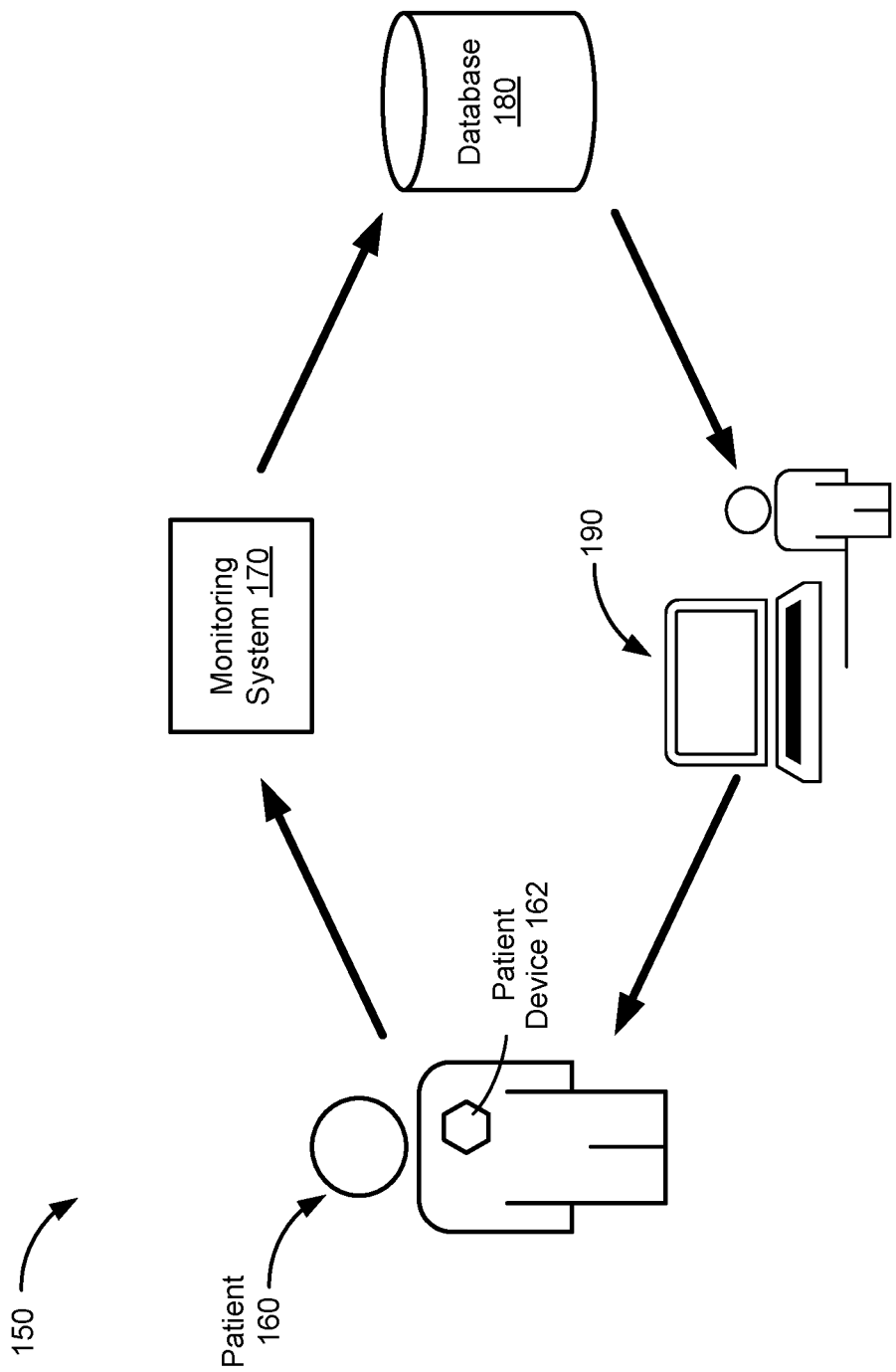
FIG. 1B illustrates an example of the secure communication system shown in FIG. 1A, according to some embodiments.

FIG. 1B illustrates an example of a secure communication system 100 that includes a medical network 150 (e.g., a medical communication network or a secure medical network), according to some embodiments. The medical network 150 includes a plurality of electronic devices that are configured to communicate securely with one another. In this example, the medical network 150 includes:

a patient device 162 (e.g., a patient monitoring device, a wearable device or implantable device such as a heart rate monitor, or a pacemaker) for acquiring, recording, and/or monitoring one or more physiological parameters of the patient 160. The patient device 162 can transmit (e.g., wirelessly and securely) patient information to a health care provider or monitoring system (such as a remote monitoring system 170). The patient device 162 may be a non-invasive wearable device (such as a heart rate monitor or a blood glucose monitor) or an implantable device (such as a pace maker). In some embodiments, the patient device 162 is also configured to provide an alert in response to a measurement being outside of an acceptable range (e.g., normal range, expected range). For example, a glucose monitoring device may provide an alert to the patient 160 when detected glucose levels drop below a threshold amount. In some embodiments, the patient device 162 is configured to administer care to the patient in response to a measurement. For example, a pace maker may send an electronic signal to the patient 160 in response to detecting abnormal heart rhythm;

a remote monitoring system 170 (e.g., a remote monitoring station) for receiving patient information transmitted from one or more patient devices 162. The remote monitoring system 170 is remotely located from the patient device 162 and is configured to receive information from one or more patient devices 162 worn by or implanted in one or more patients 160. For example, a computer may be configured to receive and store information collected (e.g., recorded, measured, acquired, obtained, or captured) by a smart phone capable of performing the functions of a pedometer and a heart rate monitor. In another example, a monitoring system at a health care provider (such as a doctor's office, clinic, or hospital) may be configured to receive information from a plurality of patient devices 162 that are worn by multiple different patients;

a database 180 (e.g., a central database or a central archiving system) for storing patient information. In some embodiments, the database 180 is stored an electronic device at a doctor's office, a clinic, or a hospital. In some embodiments, the database 180 is stored by a computer system that is remote from both the location of the patient 160 and the location of the monitoring system 170; and an electronic device 190, such as a computer at the doctor's office, clinic, or hospital that can securely communicate (e.g., transmit and receive information) from other devices (such as the patient device 162, devices of the monitoring system 170, or an electronic device that stores the database 180).

For example, patient information obtained (e.g., measured or recorded) by the patient device 162 may be transmitted (e.g., through wireless communication methods, such as wireless radio frequency (RF) transmission, over wireless network, or via BlueTooth) from the patient device 162 to the monitoring system 170. The monitoring system 170 may securely transmit the patient information to the database 180 for storage. A doctor or clinician who has access to the database 180 may securely download or view the patient information from the database 180 via a computer 190 that is part of the medical network 150 (e.g., the patient data is securely uploaded from the database 180 to the computer 190, and the patient information is downloaded by a health care provider, such as a nurse or doctor). Additionally, the doctor may reprogram a patient device 162 (via communication between a computer within the medical network 150, such as a computer 190, and the patient device 162) based on the patient information.

The medical network 150 handles sensitive information regarding the patient, which may include biographical information (e.g., date of birth), medical information (e.g., pre-existing health conditions, medications, or medical history), financial information (e.g., saved payment methods or medical insurance information). Thus, the security of the patient's information can be compromised as data is transmitted from the patient device 162 to the monitoring system 170, from the monitoring system 170 to the database 180, and/or from the database 180 to the doctor's computer 190. Additionally, if the doctor sends a message from the computer 190 to the patient device 162 to update the patient device 162 or adjust settings on the patient device 162, the electronic signal could potentially be intercepted and changed, which may have detrimental effects on the patient's health. Thus, secure communication between the devices of the medical network 150 is vital in providing safe and secure communication regarding patient information.

A secure communication system 100 may include any number of devices and be directed towards any field of application. For example, a secure communication system 100 may include one or more IoT devices such as smart phones, smart appliances (e.g., a smart refrigerator or a smart thermostat), smart fire alarm, smart door bell, smart lock, smart machines (e.g., smart cars, smart bicycles, or smart scooters), smart wearable devices (e.g., smart fitness trackers or smart watches), smart lighting (e.g., smart light bulbs or smart plugs), smart assistant devices, and smart security systems (e.g., smart cameras, smart pet monitors, or smart baby monitors). For instance a user with a smart phone may include applications that are in communication with a smart refrigerator, a smart thermostat, one or more smart bulbs, and a smart watch. Each of these smart devices (e.g., IoT devices) is able to communicate with the smart phone via a secure communication system 100 using the methods described herein.

Figure 2A:
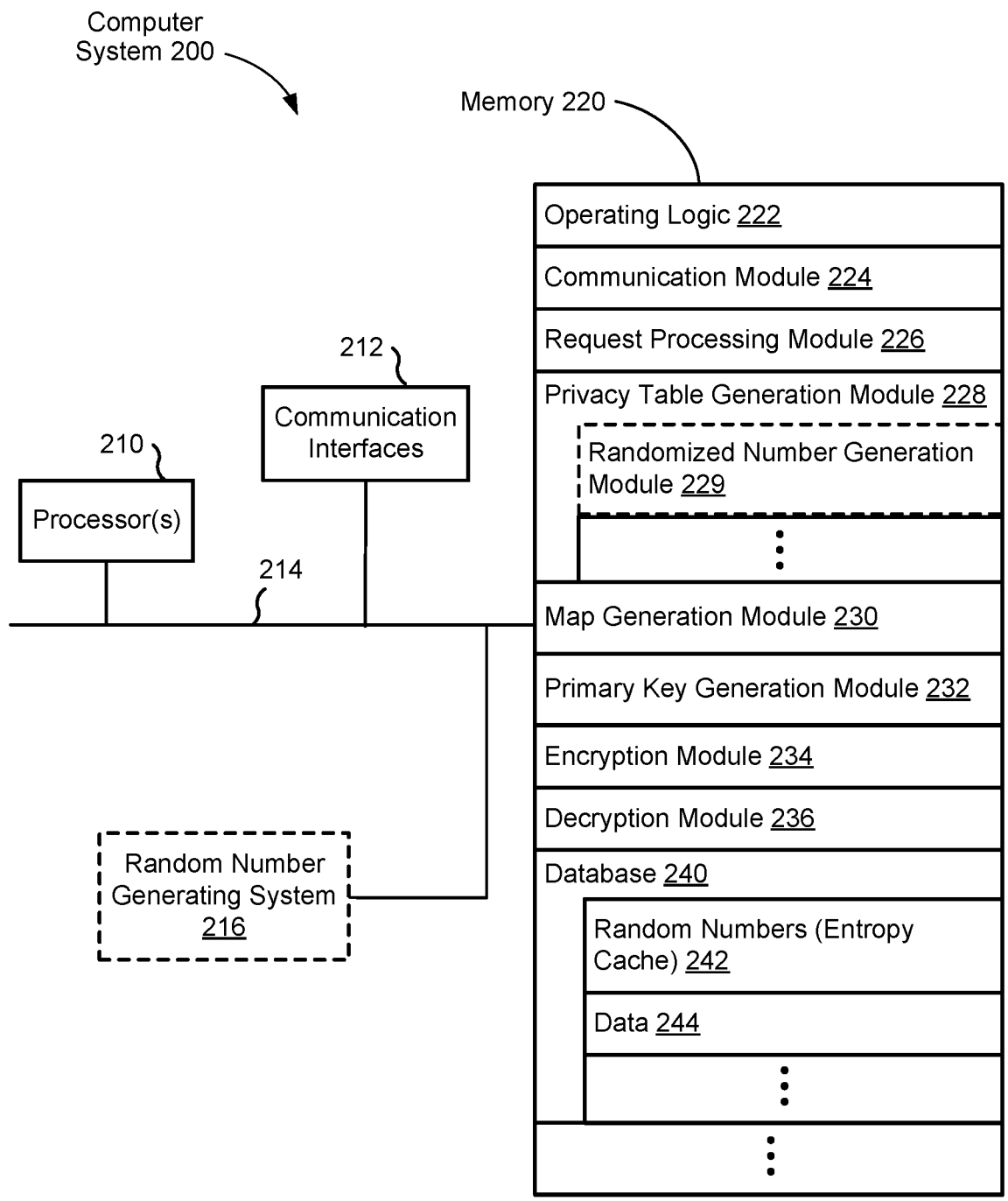
FIG. 2A is a block diagram of an electronic device of the secure communication system that can share table(s) of entropy with other devices of the secure communication system, according to some embodiments.

FIG. 2A is a block diagram of a computer system 200, such as a computer system that includes the electronic device 110 shown in FIG. 1. The computer system 200 includes one or more processors 210 (e.g., CPUs, microprocessors, or processing units), a communication interface 212, memory 220, and one or more communication buses 214 for interconnecting these components (sometimes called a chipset). In some embodiments, the computer system 200 includes or is in communication with a random number generating system 216 that is configured to generate random numbers and provide the random numbers to the computer system 200 (e.g., to devices of the computer system, such as electronic device 110). In some embodiments, the random number generating system 216 includes a random number generating device and one or more modules for controlling the random number generating device and recording the generated random numbers. For example, the random number generating device may be a physical random number generating device and the one or more modules may include an image processor for processing images from the physical random number generating device. An example of a random number generating device is disclosed in U.S. patent application Ser. No. 16/823,286, filed Mar. 18, 2020, which is incorporated by reference herein in its entirety.

In some embodiments, the memory 220 in the computer system 200 includes high-speed random access memory, such as DRAM, SRAM, DDR SRAM, or other random access solid state memory devices. In some embodiments, the memory includes non-volatile memory, such as one or more magnetic disk storage devices, one or more optical disk storage devices, one or more flash memory devices, or one or more other non-volatile solid state storage devices. The memory, or alternatively the non-volatile memory within memory, includes a non-transitory computer-readable storage medium. In some embodiments, the memory, or the non-transitory computer-readable storage medium of the memory, stores the following programs, modules, and data structures, or a subset or superset thereof:

operating logic 222, including procedures for handling various basic system services and for performing hardware dependent tasks;

a communication module 224, which couples to and/or communicates with remote devices and remote systems (e.g., the random number generation system 216, the database 180, and/or other wearable, IoT, or smart devices) in conjunction with the communication interface(s) 212;

a request processing module 226, which processes requests for random number generation;

a privacy table generation module 228, which generates privacy tables (also referred to as tables of entropy or entropy tables). A privacy table is generated using entropy blocks that include random numbers. In some embodiments, the privacy table generation module 228 includes a randomized number generation module 229 for generating random numbers based on information received from the random number generating system 216;

a map generation module 230, which generates maps (e.g., encoding/decoding maps) based on the privacy table;

a primary key generation module 232, which generates primary keys based on maps and the privacy table. In some embodiments, generating a primary key includes applying a digest function to a string;

an encryption module 234, which encrypts messages (e.g., data or text) to be transmitted. For example, the encryption module 234 may encrypt patient information prior to transmitting the patient information to an electronic device 120 that is in communication with a device (such as the electronic device 110) of the computer system 200. In some embodiments, the encryption module 234 uses a primary key that is generated by the primary key generation module 232 to encrypt a message;

a decryption module 236, which decrypts messages (e.g., data or text) received from other devices that are in communication with devices of the computer system 200. For example, the decryption module 236 is able to generate (e.g., recreate) the relevant primary key based on the received information, and uses the primary key to decrypt the message; and a database 240, which stores:

random numbers 242 that were previously generated (e.g. stored as a sequence of 8-bit bytes, 64-bit blocks, or 256-bit blocks). This is also referred to as the entropy cache. In some embodiments, entropy within a privacy table is not reused; and data 244 sent and/or received by devices (such as the electronic device 110) of the computer system 200. In some embodiments, the data 244 is transmitted to a secure log 112.

In some embodiments, the computer system 200 is a computing device that executes applications (e.g., entropy applications) to process data (e.g., random numbers) from the random number generation system 216. In some embodiments, the computer system 200 sends instructions to the database 240 using a communication interface 212, to retrieve random numbers 242 (e.g., from the entropy cache). In response to receiving the instructions, the database 240 may return random numbers 242 via the interface 212. In some embodiments, the random numbers 242 stored in the database 240 may be associated with the one or more random numbers generated by the random number generating system 216.

The computer system 200 can be implemented as any kind of computing device, such as an integrated system-on-a-chip, a microcontroller, a console, a desktop or laptop computer, a server computer, a tablet, a smart phone, or other mobile device. Thus, the computer system 200 includes components common to typical computing devices, such as a processor, random access memory, a storage device, a network interface, an I/O interface, and the like. The processor may be or include one or more microprocessors or application specific integrated circuits (ASICs). The memory may include RAM, ROM, DRAM, SRAM, and MRAM, and may include firmware, such as static data or fixed instructions, BIOS, system functions, configuration data, and other routines used during the operation of the computing device and the processor. The memory also provides a storage area for data and instructions associated with applications and data handled by the processor.

The storage device provides non-volatile, bulk, or long term storage of data or instructions in the computing device. The storage device may take the form of a magnetic or solid state disk, tape, CD, DVD, or other reasonably high capacity addressable or serial storage medium. Multiple storage devices may be provided or are available to the computing device. Some of these storage devices may be external to the computing device, such as network storage or cloud-based storage. The network interface includes an interface to a network and can be implemented as either a wired or a wireless interface. The I/O interface connects the processor to peripherals (not shown) such as sensors, displays, cameras, color sensors, microphones, keyboards, and/or USB devices.

Figure 2B:
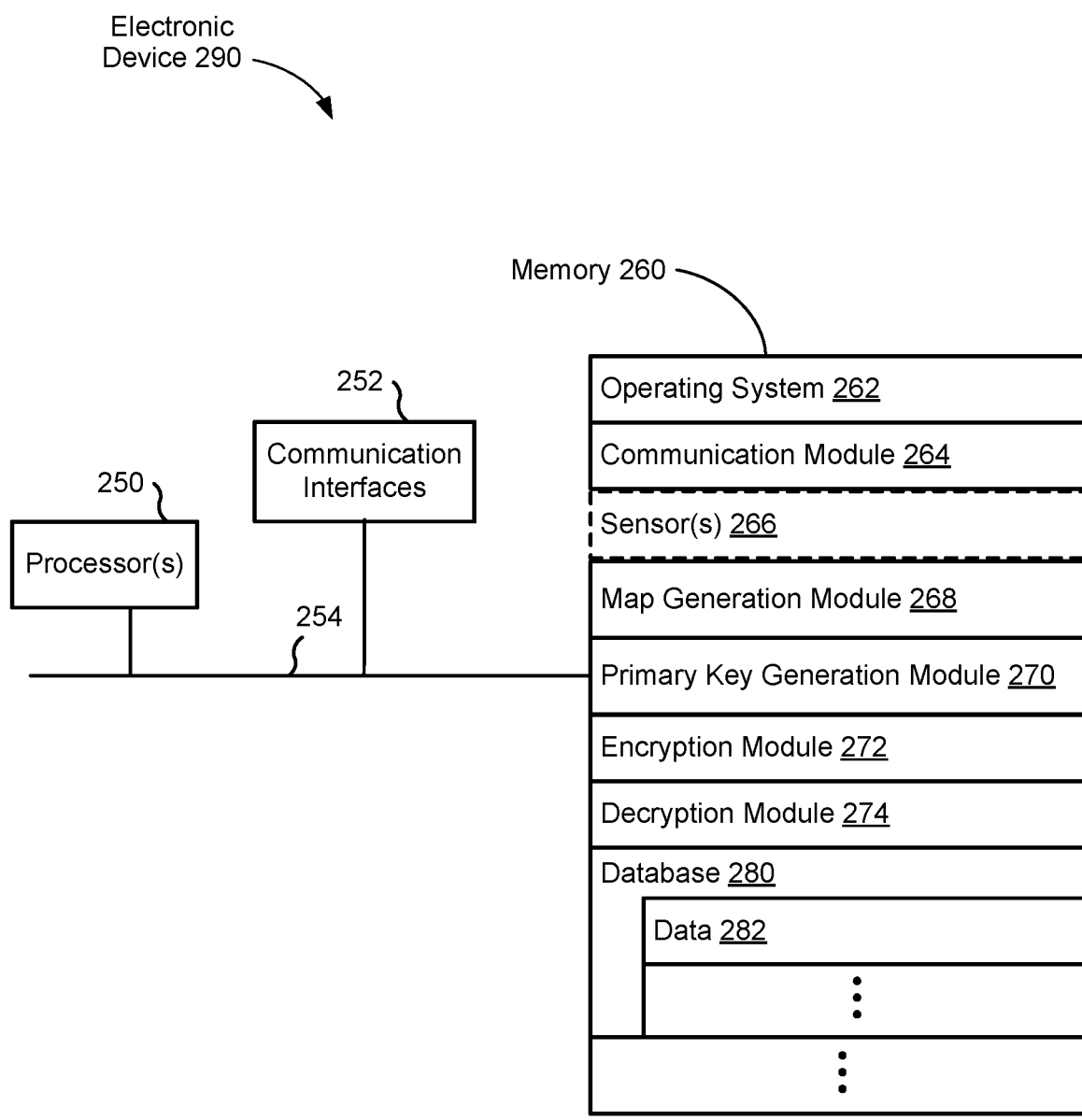
FIG. 2B is a block diagram of an electronic device of the secure communication system that can communicate with other electronic devices of the secure communication system using privately shared table(s) of entropy, according to some embodiments.

FIG. 2B illustrates an electronic device 290 (such as a patient device 162 or a doctor's computer 190) that is part of the secure communication system 100 and is in communication with one or more devices (e.g., electronic device 110) of the computer system 200 (shown in FIG. 2A), according to some embodiments. The electronic device 290 may correspond to any of electronic devices and typically includes one or more processors 250 (e.g., processing units or cores), one or more network or other communications interface(s) 252, memory 260, and one or more communication buses 254 for interconnecting these components. The communication buses 254 may include circuitry (sometimes called a chipset) that interconnects and controls communications between system components. In some embodiments, the electronic device 290 includes a user interface that includes a display, one or more inputs (such as a keyboard, mouse, microphone, and/or other input buttons). In some embodiments, the electronic device 290 includes a touch-sensitive surface, in which case the display device is a touch-sensitive display. In some embodiments, the electronic device 290 also includes output devices, such as speakers or an audio output connection connected to speakers, earphones, or headphones. In some embodiments, the electronic device 290 includes a location detection device, such as a GPS (global positioning satellite), GLONASS, Galileo, BeiDou, or other geo-location receiver, for determining the location of the electronic device 290. In some embodiments, the electronic device 290 includes an image/video capture device, such as a camera or webcam.

The memory 260 includes high-speed random-access memory, such as DRAM, SRAM, DDR RAM or other random-access solid-state memory devices, and may include non-volatile memory, such as one or more magnetic disk storage devices, optical disk storage devices, flash memory devices, or other non-volatile solid-state storage devices. The memory 260 may include one or more storage devices remotely located from the processors 250. The memory 260, or alternatively the non-volatile memory devices within memory 260, includes a non-transitory computer-readable storage medium. In some embodiments, the memory 260 or the computer-readable storage medium of the memory 260 stores the following programs, modules and data structures, or a subset or superset thereof:

an operating system 262, which includes procedures for handling various basic system services and for performing hardware dependent tasks;

a network communication module 264, which is used for connecting the electronic device 290 to other computers via the one or more communication network interfaces 252 (wired or wireless) and one or more communication networks, such as the Internet, cellular telephone networks, mobile data networks, other wide area networks, local area networks, metropolitan area networks, and so on;

a request processing module 226, which processes requests for random number generation;

one or more sensors 266, which detect (e.g., monitor, measure, or record) one or more physiological parameters and/or biological functions of a patient (e.g. heart rate, blood oxygenation, or blood sugar level). In some embodiments, the electronic device 290 also includes one or more active components configured to stimulate or send an electrical signal to the patient in response to measurements detected by the sensors 266. For example, the electronic device 290 may be a pace maker that measures the patient's heart rate (or heart beat rhythm) and sends electrical pulses to regulate a patient's heart rhythm.

a map generation module 268, which generates maps (e.g., encoding/decoding maps) based on the privacy table;

a primary key generation module 270, which generates primary keys based on the maps and the privacy table, as described above;

an encryption module 272, which encrypts messages (e.g., data or text) to be transmitted (such as patient data), as described above;

a decryption module 274, which decrypts messages (e.g., data or text) received from other devices that are in communication with devices of the computer system 200, as described above; and a database 280, which stores data 282 recorded by the one or more sensors 266 and data sent and/or received by the electronic device 290.

Each of the above identified modules and applications correspond to a set of executable instructions for performing one or more functions as described above and/or in the methods described in this application (e.g., the computer-implemented methods and other information processing methods described herein). These modules (i.e., sets of instructions) need not be implemented as separate software programs, procedures or modules, and thus various subsets of these modules can be combined or otherwise re-arranged in various embodiments. In some embodiments, the memory 220 and/or the memory 260 store a subset of the modules and data structures identified above. Furthermore, the memory 220 and/or the memory 260 may store additional modules and data structures not described above.

Attention is now directed towards embodiments of secure transmission of data between devices of the secure communications system 100.

Figure 3A:
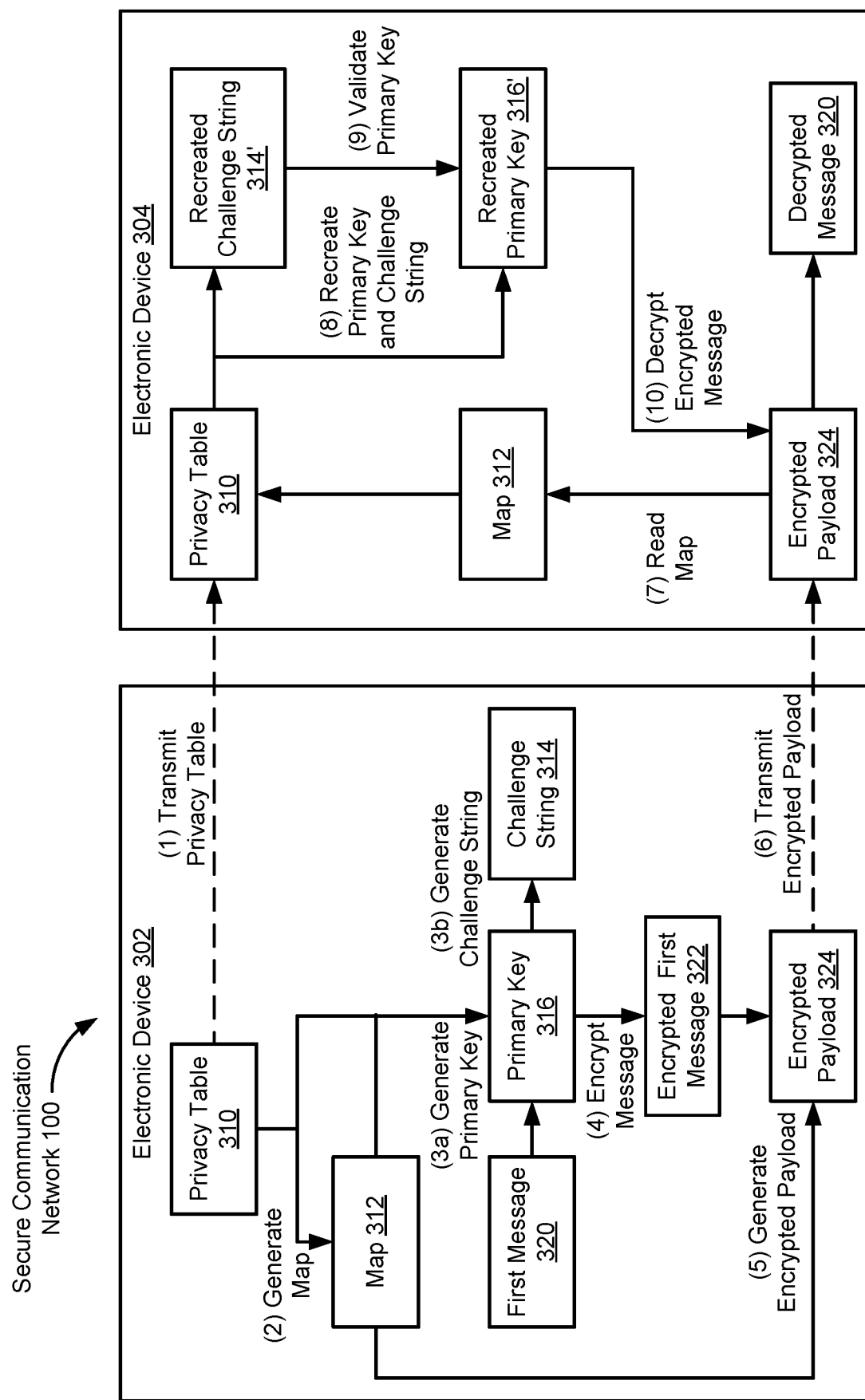
FIGS. 3A-3B illustrate secure communication between two devices of a secure communication system, according to some embodiments.
Figure 3B:
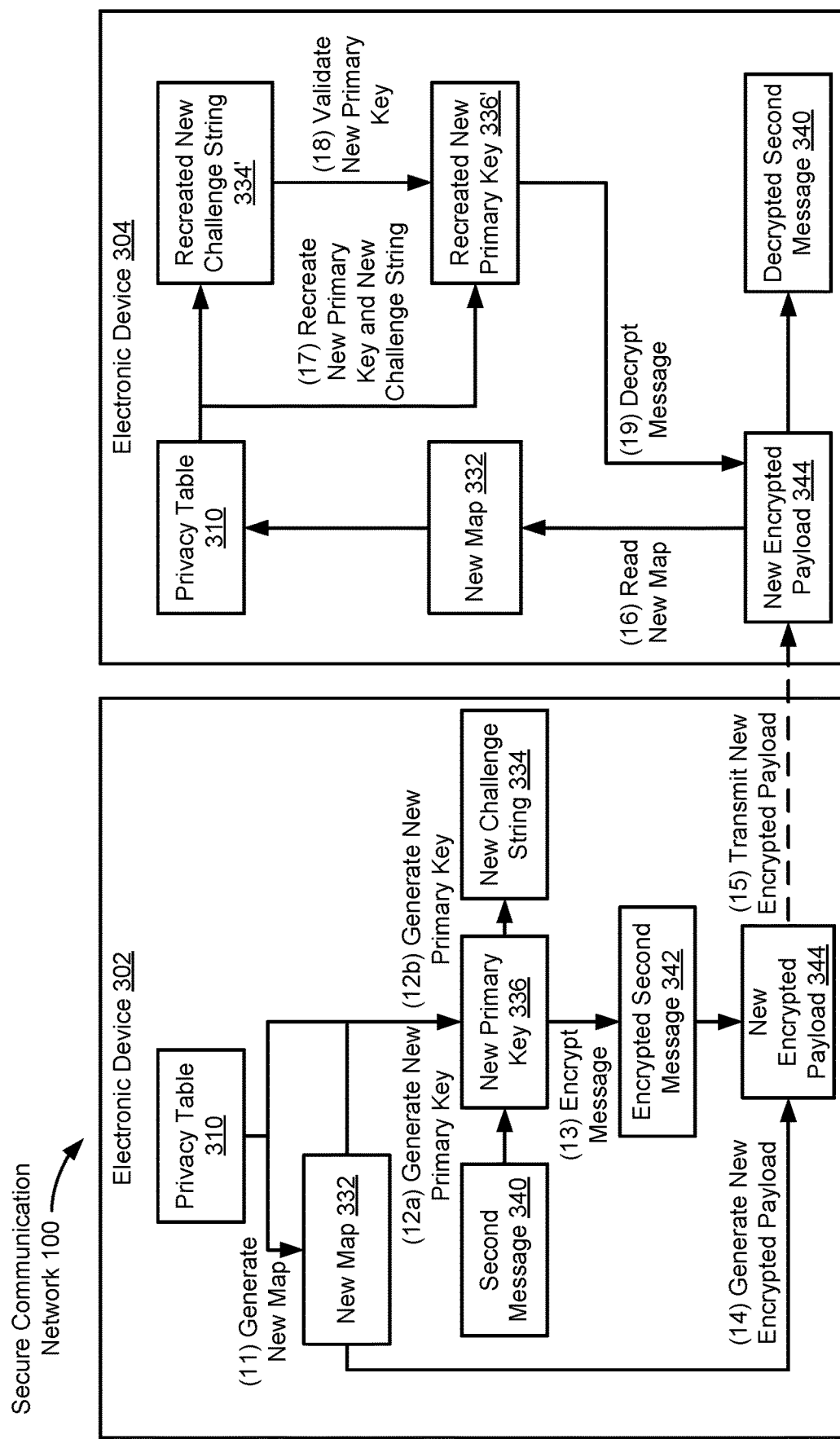
Figure 3C:
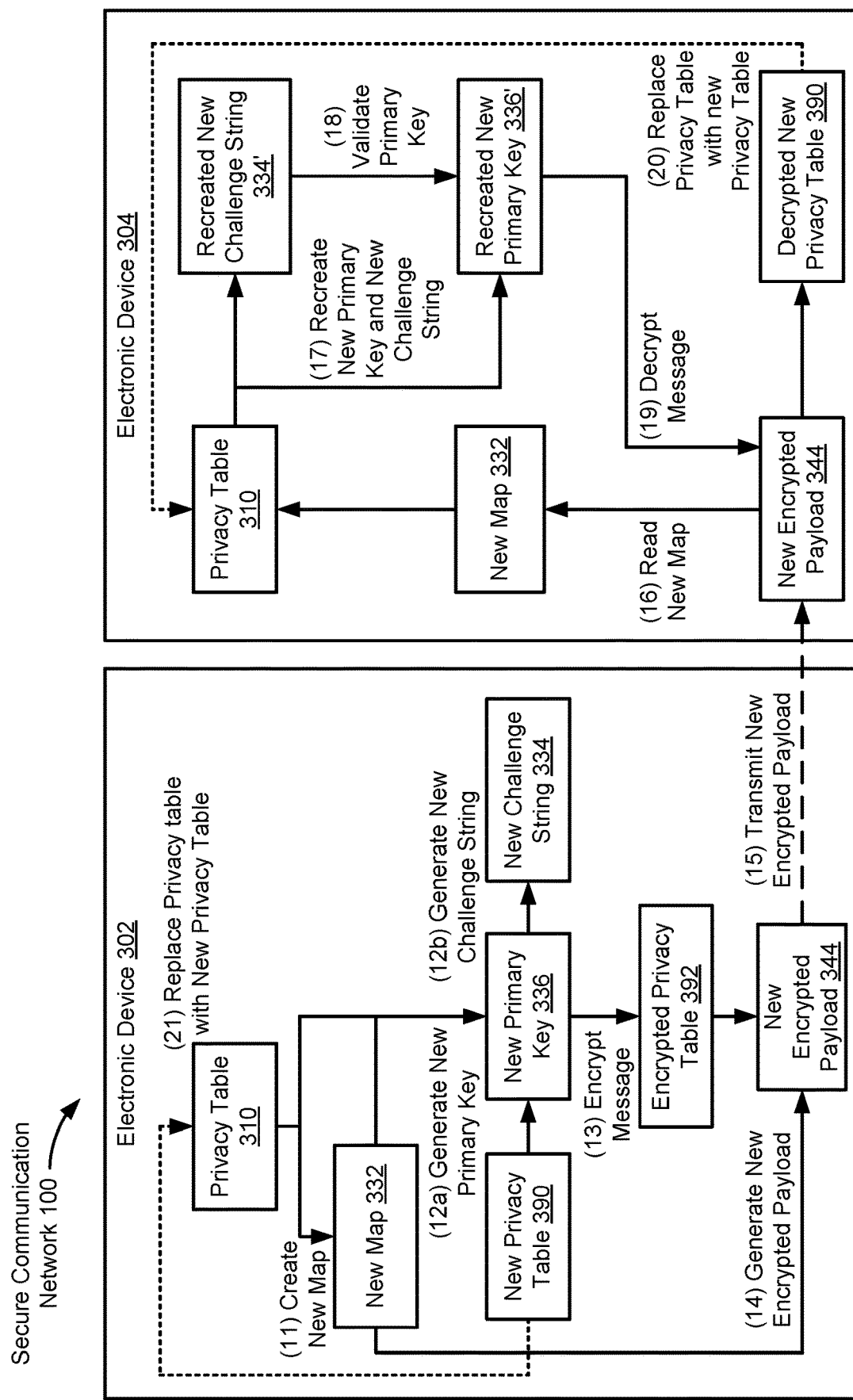
FIG. 3C illustrates updating privacy tables at two devices of a secure communication system, according to some embodiments.

FIGS. 3A-3C illustrate secure communication between two devices (e.g., electronic devices 302 and 304, two devices that are distinct from one another) of a secure communication system 100, according to some embodiments. Each of the electronic devices 302 and 304 may correspond any of the electronic devices 110, 120, 130, 140, or an electronic device associated with the secure log 112 shown in FIG. 1A. When the secure communication system 100 includes a medical network 150, each of the electronic devices 302 and 304 may correspond to any of a patient device 162, a device of the remote monitoring system 170, a device associated with the database 180, and a device 190 associated with a health care provider (e.g., a doctor, a clinic, or a hospital) shown in FIG. 1B. For example, the first electronic device 302 may correspond to electronic device 110 and the second electronic device 304 may correspond to electronic device 120, or vice versa. In another example, the first electronic device 302 may correspond to the electronic device 110 and the second electronic device 304 may correspond to an electronic device that is part of a computer system or server system that stores the secure log 112, or vice versa. In yet another example, the first electronic device 302 may correspond to a patient device 162 and the second electronic device 304 may correspond to a computer 190 at a doctor's office, or vice versa.

The electronic device 302 stores a privacy table 310 (e.g., a table of entropy) consisting or random bits. The electronic device 302 transmits (step 1) the privacy table 310 to the electronic device 304 over an encrypted channel, and the electronic device 304 stores the transmitted privacy table 310. The electronic device 302 generates (step 2) a map 312 (e.g., an encoding/decoding map 312) and generates (step 3a) a primary key 316 (e.g., an encryption key) based on the map 312 (e.g., values in the map 312) and the random numbers (e.g., bits) stored in the privacy table 310. The electronic device 302 also generates (step 3b) a challenge string 314 based on the primary key 316 (e.g., the challenge string 314 is derived from the primary key 316). In some embodiments, the challenge string 314 can be transmitted from the electronic device 302 to the electronic device 304 separately from any of the map 312, the primary key 316, and an encrypted message (e.g., transmitted out-of-band), and used by the electronic device 304 to validate that the primary key 316 is correctly recreated and that the transmitted information can be trusted. In some embodiments, the electronic device 302 applies a digest function (such as SHA256) to the primary key 316 to generate (step 3b) the challenge string 314 (e.g., the primary key 316 is a digest, such as a SHA256 digest, of the challenge string 314).

In some embodiments, the map 312 includes information regarding how to use the privacy table 310 to generate the primary key 316 and/or the challenge string 314. For example, values in the map 312 may correspond to any of: a starting position in the privacy table, an offset value, and a read direction. Additional details regarding the map 312 are provided below with respect to FIGS. 4A and 4B. In some embodiments, the map 312 is generated using a subset or a portion, less than all, of the random numbers (e.g., bits) stored in the privacy table 310. In some embodiments, the primary key 316 and the challenge string 314 are generated using a subset or a portion, less than all, of the random numbers (e.g., bits) stored in the privacy table 310. In some embodiments, the map 312 does not include information (e.g., an identifier) regarding which privacy table it is associated with (e.g., generated from).

The electronic device 302 encrypts (step 4) a first message 320 (e.g., data) using the primary key 316 to form an encrypted first message 322. For example, the electronic device 302 may use a symmetric cipher, such as AES-256 (which is a symmetric cipher that encrypts in blocks of 256 bits), to encrypt the first message 320. The electronic device 302 generates (step 5) an encrypted payload 324 (also referred to as ciphertext) that includes the map 312 and the encrypted first message 322. In some embodiments, the encrypted payload 324 includes the map 312 prepended to the encrypted first message 322. In some embodiments, such as when a symmetric cipher is used, the primary key 316 is a symmetric key (e.g., the same primary key can be used to encrypt the message to form an encrypted message and to decrypt the encrypted message to recreate the original message). Examples of the encrypted payload 324 are provided with respect to FIGS. 4A and 4B. Examples of symmetric ciphers include (without limitation): AES, Blowfish, RC4, Twofish, Serpent, Camellia, Salsa20, ChaCha20, CASTS, Kuznyechik, DES, 3DES, Skipjack, Safer, and IDEA. In some embodiments, the cipher used to encrypt the message is determined (e.g., selected) based on the period of time for which the information stored in the message is required to remain secure. For example, if information stored in an encrypted message expires (e.g., becomes irrelevant) within 30 seconds, a first symmetric cipher (e.g., RC4) may be used to encrypt the message. In contrast, if information stored in an encrypted message is required to remain secure for a long period of time (e.g., months, years, or permanently) a different symmetric cipher may be used to encrypt the message.

The electronic device 302 transmits (step 6) the encrypted payload 324 (which includes the map 312 and the encrypted first message 322) to the electronic device 304. Because the message is encrypted, the transmission need not be over an encrypted or secure channel. The encrypted payload 324 is transmitted (in step 6) at a different time from a time of transmission of the privacy table 310 (in step 1). For example, the encrypted payload 324 is transmitted subsequent to transmission of the privacy table 310 (e.g., the privacy table 310 is transmitted as part of a payload that is distinct from the encrypted payload 324).

The electronic device 304 receives the encrypted payload 324 (which includes the map 312 and the encrypted first message 322) from the electronic device 302 and reads (e.g., extracts or determines) (step 7) the map 312 (e.g., the encoding/decoding map 312) from the encrypted payload 324. The electronic device 304 then uses the information from the map 312 and the privacy table 310 to recreate (step 8) the challenge string 314 (e.g., to generate a recreated challenge string 314') and the primary key 316 (e.g., to generate a recreated primary key 316'). In some embodiments, the challenge string 314 can be derived from the primary key 316 (and thus, the recreated challenge string 314' can be derived from the recreated primary key 316'). In some embodiments, the recreated challenge string 314' is the same as (e.g., identical to) the challenge string 314. The electronic device 304 uses the recreated challenge string 314' to validate (step 9) the primary key 316 (e.g., to generate a recreated primary key 316') and uses the recreated primary key 316' to decrypt (step 10) the encrypted first message 322 in the encrypted payload 324 to form the decrypted first message 320. The electronic device 302 then initializes a decryption protocol (e.g., a decryption algorithm, such as AES256), which corresponds to the encryption protocol used to encrypt the message, using the recreated primary key 316' and decrypts the encrypted first message 322 to form the decrypted first message 320.

In some embodiments, the recreated primary key 316' is the same as (e.g., identical to) the primary key 316. For example, in some embodiments, such as when the first message 320 is encrypted using a symmetric cipher (such as AES-256), the encrypted first message 322 can be decrypted using a recreated primary key 316' that is identical to the primary key 316 used to encrypt the first message 320 to form the encrypted first message 322.

The process described in FIG. 3A (e.g., steps 1 through 10) are repeated for each new message sent from the electronic device 302 to the electronic device 304. As shown in FIG. 3B, for transmission of a second message 340, the electronic device 302 generates a new map 332 (e.g., encoding/decoding map 332) for the second message 340 such that the second message 340 is encrypted based on (e.g., using) a new primary key 336 that is different (e.g., distinct) from the primary key 316 used for encrypting the first message 320 (e.g., previously sent messages). The process described in FIG. 3A (e.g., steps 1 through 10) is cipher agnostic and can be conducted using any encryption protocol (and any decryption protocol).

FIG. 3B illustrates a process of securely transmitting a second message 340, distinct from the first message 320, from the electronic device 302 to the electronic device 304. The electronic device 302 generates (step 11) a new map 332 (e.g., an encoding/decoding map 332) that is different (e.g., distinct) from the map 312. The electronic device 302 also generates (step 12a) a new primary key 336 (e.g., an encryption key) based on the map 312 and the random numbers (e.g., bits) stored in the privacy table 310. The electronic device 302 then generates (12b) a new challenge string 334 from the primary key 336. Since the new map 332 is different from the map 312, the new primary key 336 is different (e.g., distinct) from the primary key 316, and the new challenge string 334 is different (e.g., distinct) from the challenge string 314.

The electronic device 302 encrypts (step 13) the second message 340 (e.g., data) using the new primary key 336 to form an encrypted second message 342. The electronic device 302 generates (step 14) a new encrypted payload 344 that includes the new map 332 and the encrypted second message 342. In some embodiments, the new encrypted payload 344 includes the map 332 prepended to the encrypted second message 342.

The electronic device 302 transmits (step 15) the new encrypted payload 344 (which includes the new map 332 and the encrypted second message 342) to the electronic device 304 over an encrypted channel. The new encrypted payload 344 is transmitted (in step 15) at a different time from a time of transmission of the privacy table 310 (in step 1) and at a different time from a time of transmission of the encrypted payload 324 (in step 6).

The electronic device 304 receives the new encrypted payload 344 (which includes the new map 332 and the encrypted second message 342) from the electronic device 302 and reads (e.g., extracts or determines) (step 16) the new map 332 from the new encrypted payload 344. The electronic device 304 then uses the information from the new map 332 and the privacy table 310 to recreate (step 17) the new primary key 336 (e.g., generate a recreated new primary key 336') and the challenge string 334 (e.g., generate a recreated challenge string 334). The electronic device 304 uses the recreated challenge string 334' to validate (step 19) the new primary key 336, and uses the recreated primary key 336' to decrypt (step 19) the second encrypted message 342 in the new encrypted payload 344 to form a decrypted second message 346.

In some embodiments, the electronic devices updates the privacy table 310 with a new privacy table. A new privacy table can be transmitted using the secure message transmission process described above with respect to FIGS. 3A-3B.

FIG. 3C illustrates updating privacy tables at two devices of a secure communication system, according to some embodiments. When the message is a new privacy table 390, the electronic device 304, after decrypting the privacy table (e.g., decrypts the new privacy table 390) (in step 19) stores (step 20) the decrypted new privacy table 390 in place of the privacy table 310 (e.g., replaces the privacy table 310 with the new privacy table 390). In such cases, the electronic device 302 also replaces (step 21) the privacy table 310 with the new privacy table 390 (e.g., stores the new privacy table 390 in place of the privacy table 310) after transmitting the encrypted payload 344 that includes the encrypted privacy table 392. Once the privacy table 310 is replaced by the new privacy table 390, subsequent messages that are transmitted between the electronic devices are encrypted and decrypted using the new privacy table 390.

In some embodiments, the privacy tables, such as privacy table 310 and new privacy table 390, are generated by the random number generating system 216. In some embodiments, the privacy tables are generated by the computer system 200 (e.g., by a device of the computer system 200, such as electronic device 302) using random numbers generated by the random number generating system 216. In some embodiments, generating the privacy table includes determining the number of required keys for a predefined period of time and determining the size of the privacy table based on the number of required keys. The predefined period of time corresponds to a time interval (e.g., predefined time interval) for replenishing the privacy table. The size of the new privacy table may be the same or may be different from a size of the old privacy table (e.g., the same if the needs are the same, or different if the expected needs are different). In some embodiments, the privacy table stored at devices (such as the devices 302 and 304) of the secure communication system 100 is updated (e.g., replenished) at predefined intervals (e.g., after a predefined period of time).

In some embodiments, updating the privacy table includes updating (e.g., replenishing) the entire privacy table (e.g., replace all random numbers (e.g., bits) stored in the privacy table with new random numbers (e.g., new bits)). In some embodiments, updating the privacy table includes updating (e.g., replenishing) a subset or portion, less than all, of the random numbers (e.g., bits) in the privacy table. For example, only random numbers (e.g., bits) that have been used (e.g., that have been read) may be replaced (e.g., replenished) and other numbers stored in the privacy table that have not been used may remain unchanged.

Figure 3D:
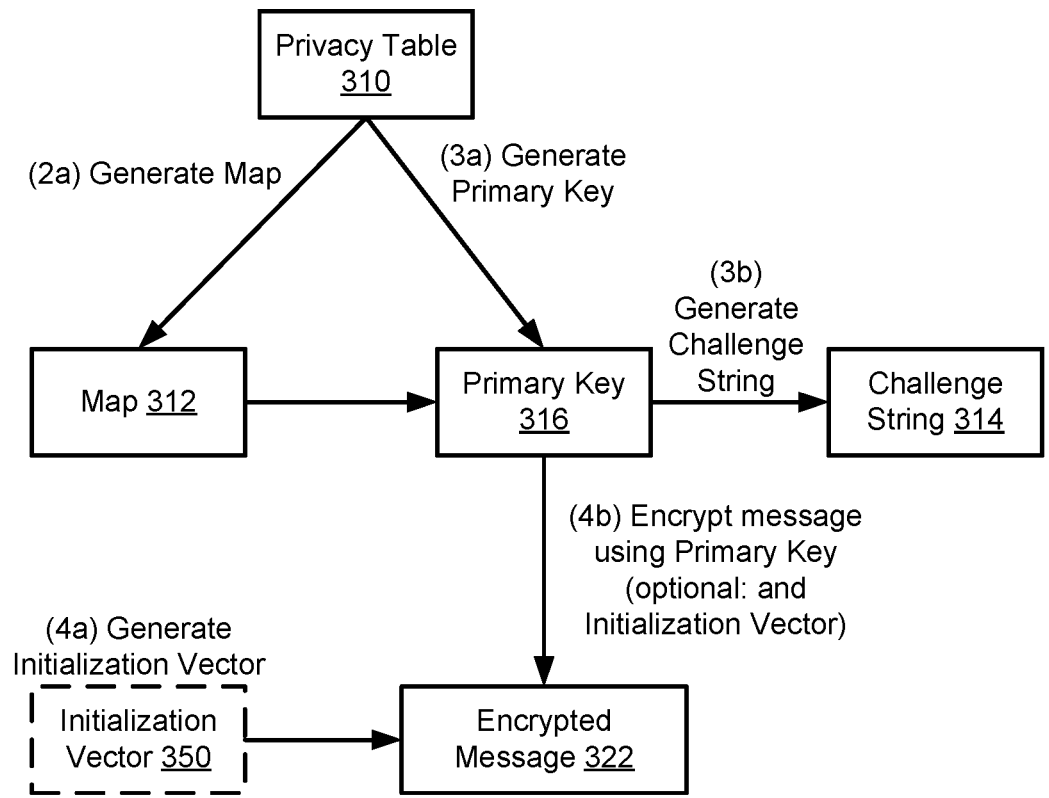
FIG. 3D illustrates generating a primary key based on a map and a privacy table, according to some embodiments.

FIG. 3D illustrates generating a primary key 316 based on a map 312 (or encoding/decoding map 332) and a privacy table 310 (or privacy table 390), according to some embodiments.

The map 312 is generated (step 2a) based on random numbers (e.g., bits) stored in the privacy table 310. In some embodiments, generating the map 312 includes identifying a start position within the privacy table 310 and a read direction (e.g., spin). In some embodiments, the start position is randomly selected (e.g., using a pseudo-random number generator). In some embodiments, the read direction is randomly selected (e.g., using a pseudo-random number generator). The map 312 is generated by reading the random numbers (e.g., bits) in the privacy table 310 starting at the start location and reading the random numbers (e.g., bits) stored in the privacy table 310 in the read direction.

The primary key 316 is generated (step 3a) based on values in the map 312 (e.g., the random numbers that make up the map 312) and the random numbers (e.g., bits) stored in the privacy table 310, and a challenge string 314 (step 3b) is generated based on (e.g., is derived from) the primary key 316. The primary key 316 that is used to encrypt (step 4b) a message. For example, to encrypt a message, the electronic device 302 may initialize an encryption protocol (e.g., an encryption algorithm, such as AES256) that uses the primary key 316 to encrypt the message and form an encrypted message.

In some embodiments, the process of securely transmitting an encrypted message 322 includes generating (step 4a) an initialization vector 350 and using the initialization vector 350 in conjunction with the primary key 316 to encrypt the message 320. For example, when the transmitted message 322 is part of a live stream that includes continuous transmission of a plurality of messages (or a continuous transmission of a plurality of payloads 324), each message is encrypted using a unique primary key 316 and also optionally includes a unique initialization vector 350. In some embodiments, the initialization vector 350 (when included) is automatically updated (e.g., a new initialization vector 350 is automatically created) for each new message 320 to by encrypted.

Figure 3E:
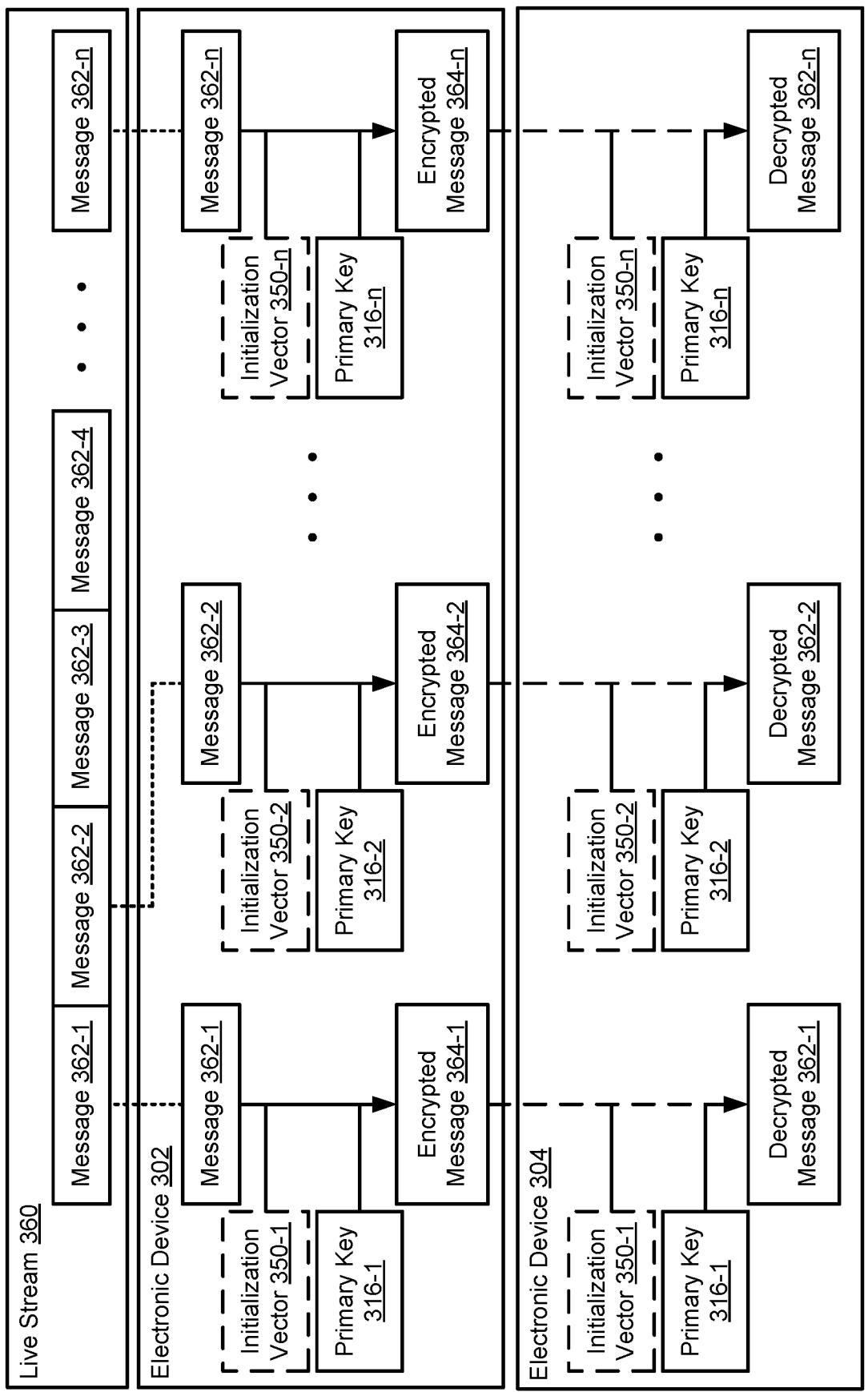
FIG. 3E illustrates transmitting a live stream, according to some embodiments.
Figure 5A:
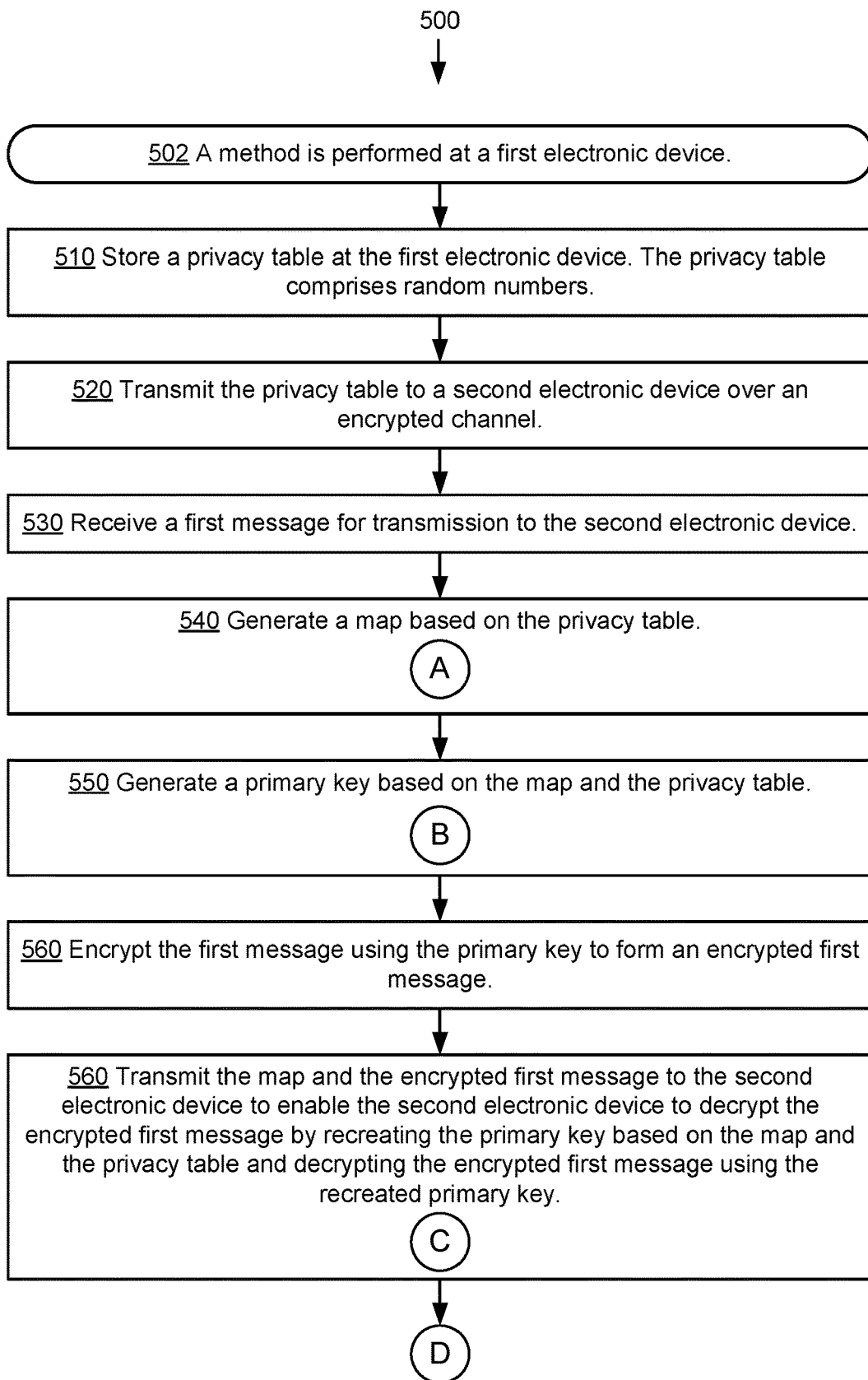
FIGS. 5A-5F illustrate a flow chart of a method for secure communications, according to some embodiments.
Figure 5B:
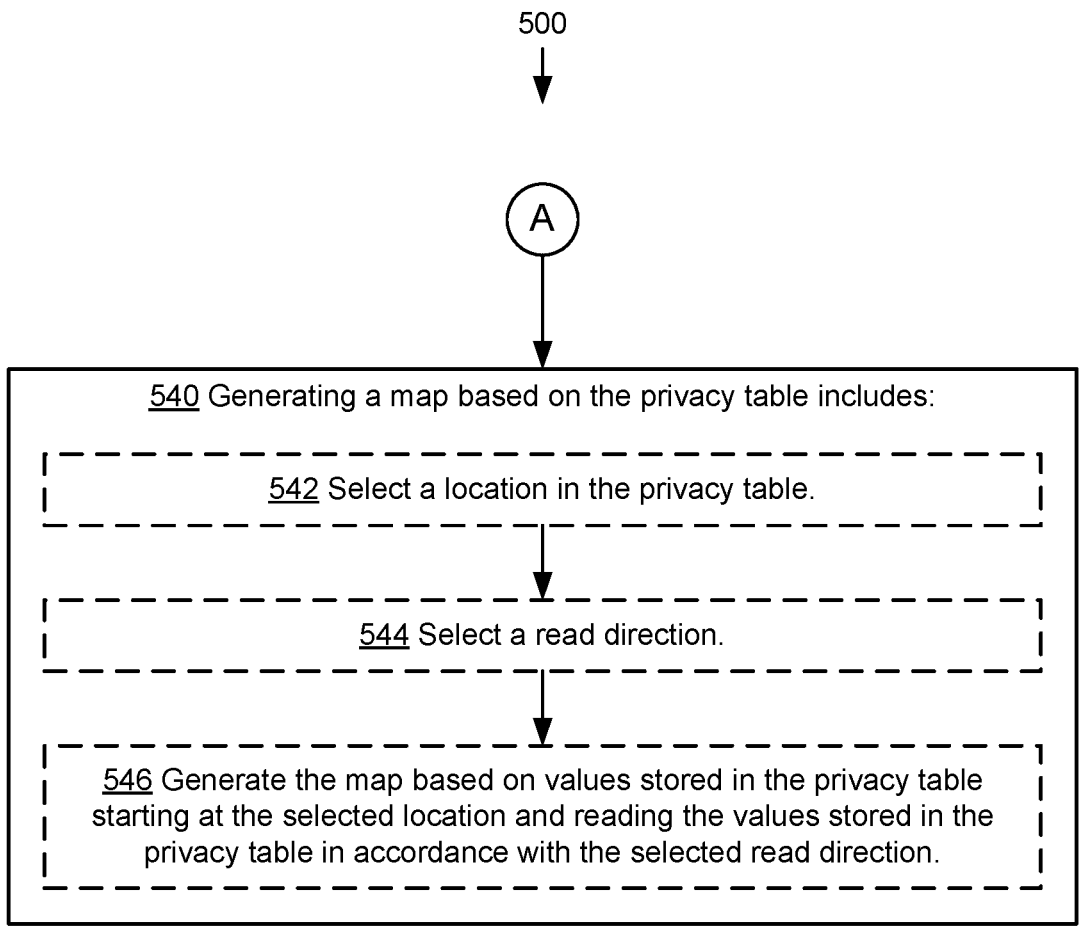
Figure 5C:
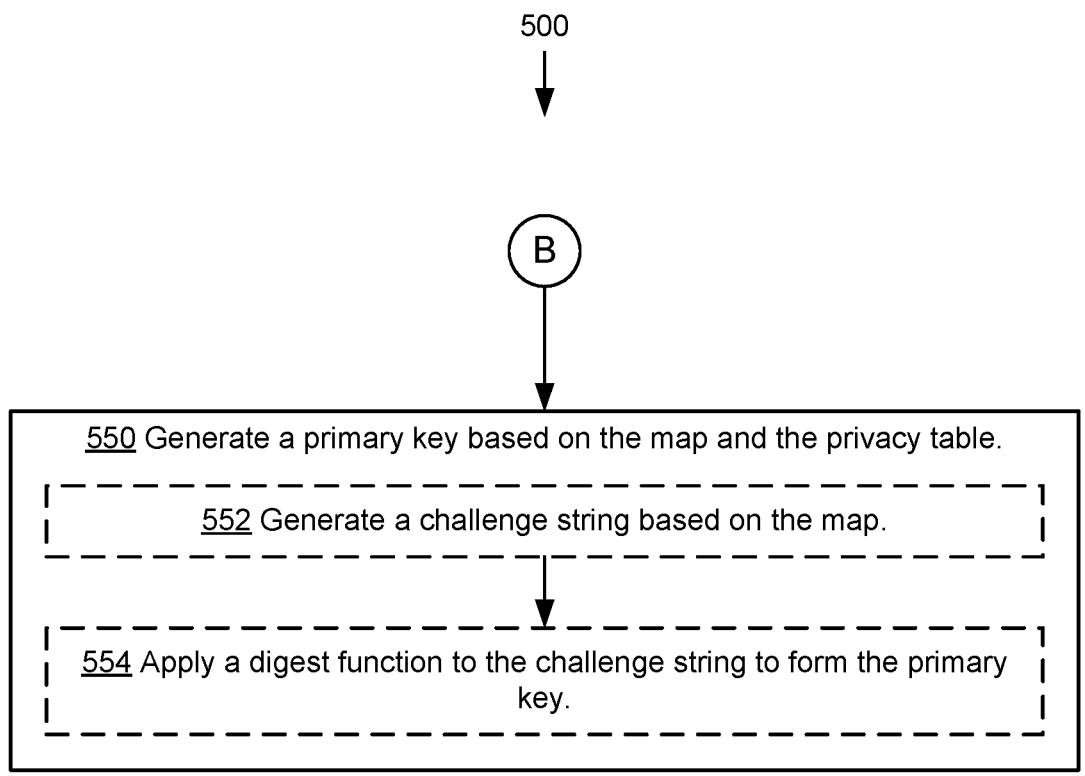
Figure 5D:
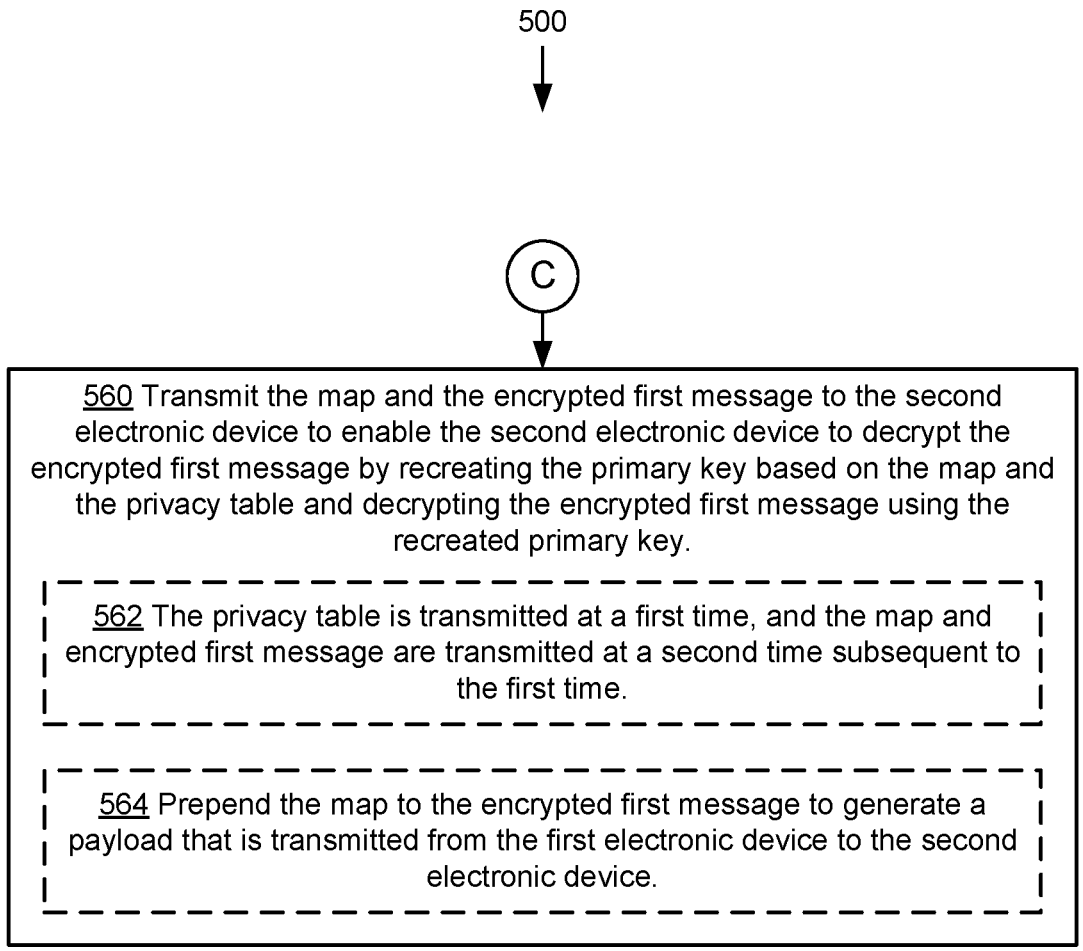
Figure 5E:
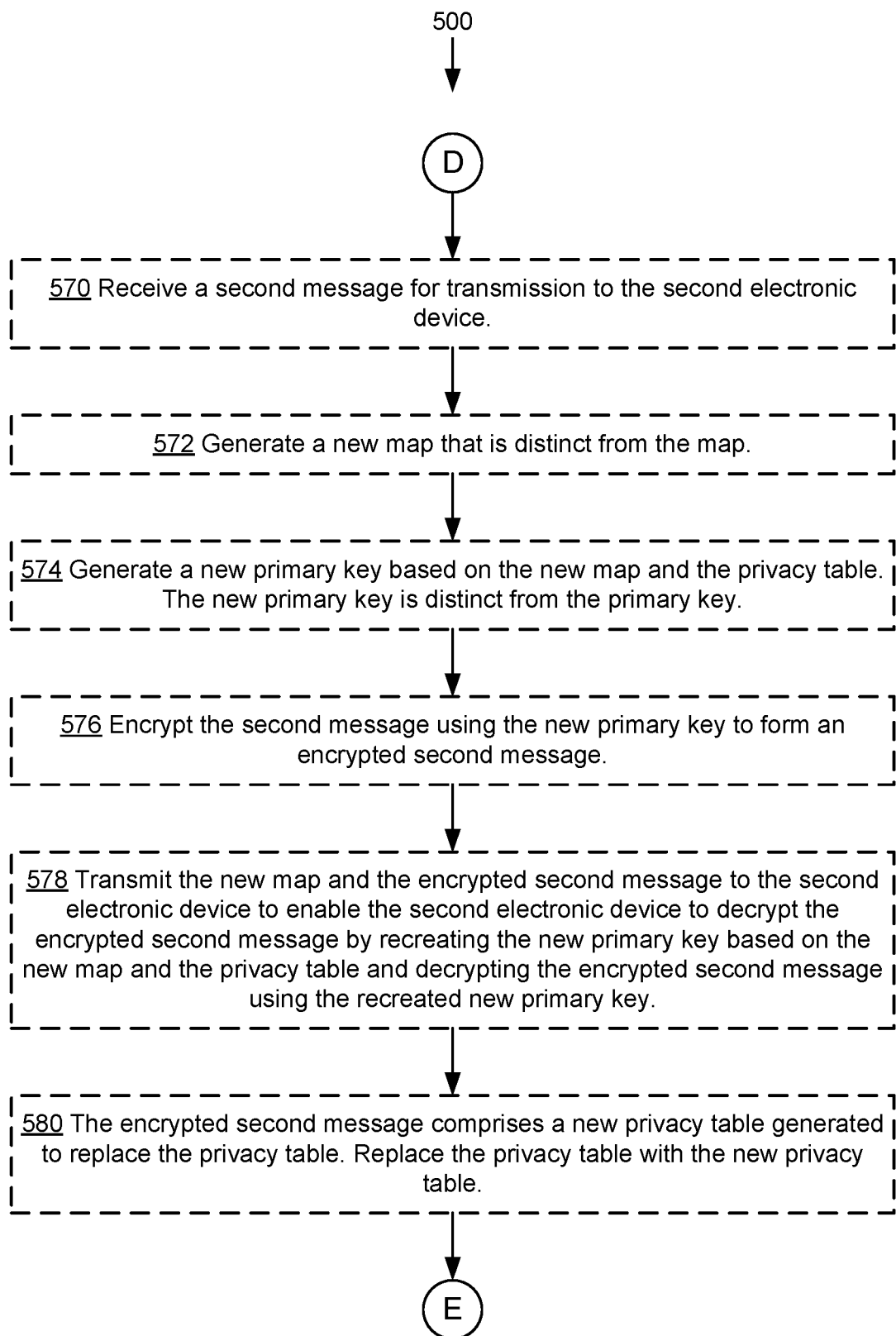
Figure 5F:
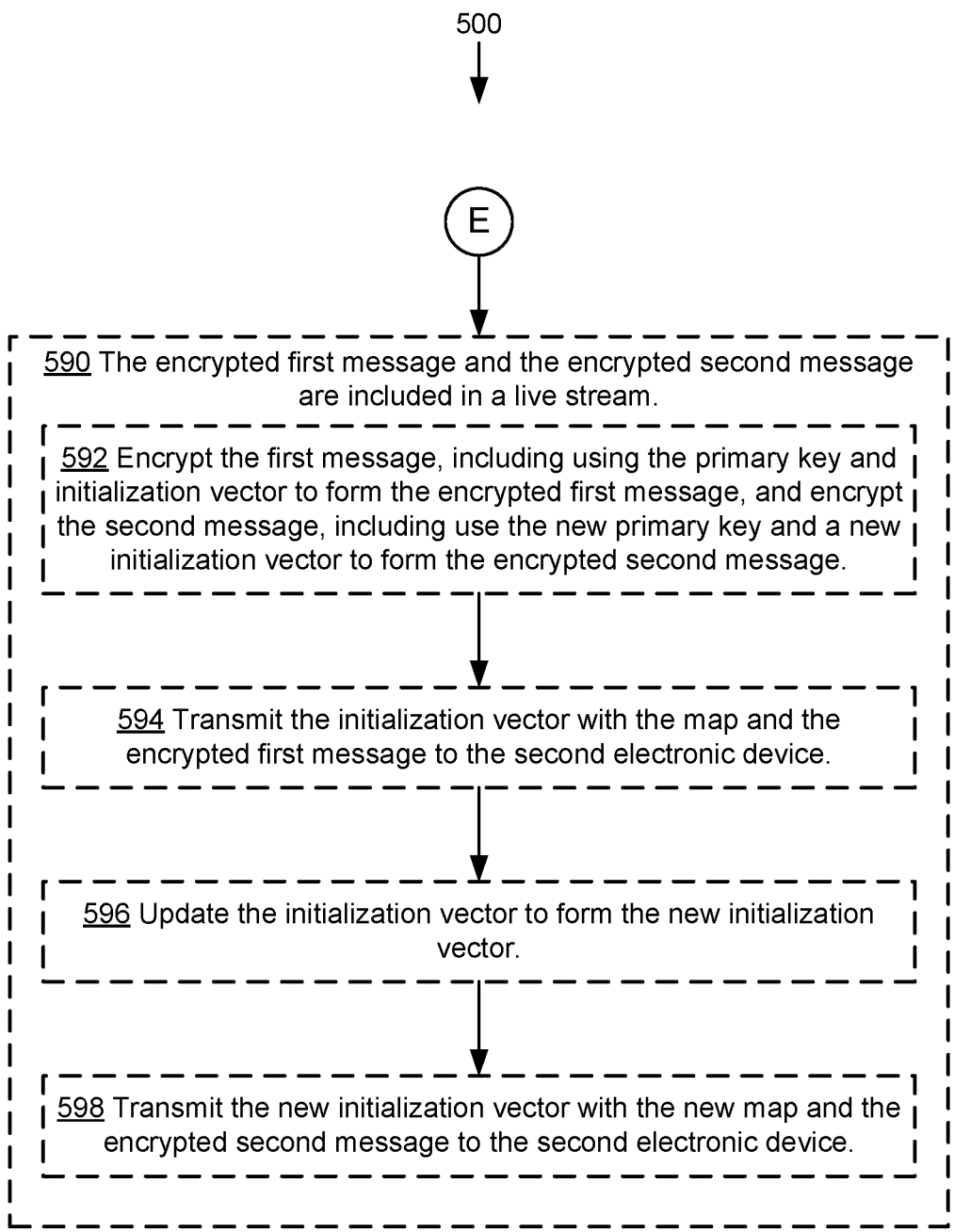

FIG. 3E illustrates transmitting a live stream 360, according to some embodiments. A live stream includes transmission of files from a first device to second device for playback at the second device in real time. FIG. 3E illustrates an example of how a live stream 360 can be securely transmitted (e.g., via encryption, such as encryption using a symmetric cipher) between devices 302 and 204 of the secure communication network 100. In this example, the live stream 360 includes a plurality of messages 362-1 through 362-n (also referred to collectively as messages 362). Each of the messages 362 can be considered to be a portion of the live stream 360. In this example, the live stream 260 includes n portions (e.g., is divided into n number of portions). For example, when the live stream 360 is an audio stream, the message 362-1 corresponds to the first 10 seconds of the audio stream, the message 362-2 corresponds to the next 10 seconds of the audio stream, and so on and so forth until the end of the audio stream. In this example, the message 362-n corresponds to the last moments of the audio stream (e.g., last 10 seconds of the audio stream). Thus, in order to transmit the live stream 360 (e.g., the encrypted live stream 360) from the electronic device 302 to the electronic device 304, each message 362 of the live stream 360 must be encrypted at the electronic device 302, then transmitted to the electronic device 304 such that the messages 362 can be decrypted by the electronic device 304 as quickly as the electronic device 302 can encrypt and send the messages 362. In some embodiments, the electronic device 302 uses a symmetric cipher to encrypt the messages 362.

In some embodiments, the electronic device 302 encrypts a respective message of the messages 362 of the live stream 360 using a unique primary key 316 to form the encrypted message 364-1. For example, the message 362-1 is encrypted using a primary key 316-1, and the message 362-2 is encrypted with a primary key 316-2. The primary key 316-2 is distinct (e.g., different) from the primary key 316-1 (e.g., the primary key 316-2 is generated based on a map that is different from another map used to generate the primary key 316-1). In some embodiments, the primary keys 316-1 and 316-2 are generated based on the same privacy table (e.g., different portions of the same privacy table). Alternatively, the primary keys 316-1 and 316-2 may be generated based on different privacy tables.

In some embodiments, the electronic device 302 encrypts respective messages 362 of the live stream 360 using an initialization vector 350 (in addition to using a primary key 316) to form the encrypted message 364-1. For example, the message 362-1 is encrypted with a primary key 316-1, and optionally, an initialization vector 350-1, and the message 362-2 is encrypted with another primary key 316-1 and optionally, another initialization vector 350-2. In some embodiments, the initialization vector 350-2 (when included) is distinct (e.g., different) from the initialization vector 350-1. In some embodiments, the initialization vectors 350-1 and 350-2 are the same.

After encrypting an respective message 364, the electronic device 302 transmits the respective encrypted message 364 to the electronic device 304 as part of a payload that includes a respective map that corresponds to the respective message 362 (e.g., the map that corresponds to the respective primary key used to encrypt the message 362) and, optionally, the respective initialization vector 350 that corresponds to the respective message 362. An example of a live stream 360 transmission is provided below with respect to FIG. 4B.

In some embodiments, after transmitting the respective encrypted message 364, the electronic device 302 generates a new initialization vector 350-2 (that is different from initialization vector 350-1), and generates a new map in order to generate a new primary key 316-2. The electronic device 302 continues to encrypt messages 362 of the live stream 360 using unique primary keys 316 (and unique initialization vectors 350 in some embodiments), for each of the messages 362 of the live stream 360 until the end of the live stream 360. Thus, the electronic device 302 repeatedly generates new maps and new initialization vectors 350 until the last message 362 of the live stream 360 has been encrypted.

In some embodiments, such as when initialization vectors 350 are used as part in transmission of a live-stream, generating the new initialization vector 350-2 includes updating a preceding initialization vector 350-1 such that new initialization vectors for encrypting subsequent messages 362 of the live stream 360 are generated based at least in part on a preceding initialization vector (e.g., based on an initialization vector used to encrypt a message 364 directly preceding the current message to be encrypted). For example, after message 362-1 has been encrypted using a first initialization vector 350-1 and a first primary key 316-1, the electronic device 302 generates a new initialization vector 350-2 that is based at least in part on the first initialization vector 350-1. When the initialization vectors 350 for encrypting messages 362 of a live stream 360 are generated by updating previous initialization vectors in the live stream 360, it is possible to detect if messages 362 of the live stream 360 are received by the electronic device 304 out of order (e.g., in an order that is different from an intended order or a transmitted order) and/or if a respective payload (which includes a respective encrypted message 364, a corresponding map, and a corresponding initialization vector 350) transmitted from the electronic device 302 to the electronic device 304 has been tampered with or altered in anyway. For example, when AES encryption algorithm is used to encrypt the live stream 360, the live stream 360 (e.g., messages 362 of the live stream 260) can be encrypted using a cipher feedback (CFB) mode or an output feedback (OFB) mode.

Upon receiving a respective encrypted message 364 transmitted from the electronic device 302, the device electronic 304 decrypts the respective encrypted message 364 the respective primary key 316 (generated based on the respective map that is received along with the respective encrypted message 364) (using the respective initialization vector 350 in some embodiments). The electronic device 304 continues this decryption process for each message 364 of the live stream 360 that it receives. In some embodiments, the electronic device 304 is able to decrypt the transmitted encrypted messages 364 in real time.

In some embodiments, the electronic device 302 shares a specific privacy table with no more than one device (e.g., shares privacy table 310 with only electronic device 304). In such cases, if the electronic device 302 needs to securely communicate with a plurality of different devices (e.g., with the electronic device 304 as well as at least one other electronic device that is distinct from the electronic device 304) the electronic device 302 may store a plurality of privacy tables such that messages transmitted to different devices are encrypted based on (e.g., using) different privacy tables. For example, a primary key used to encrypt a message to be transmitted to the electronic device 302 is generated based on a map and a first privacy table, and a primary key used to encrypt a message (may be the same message or a different message) to be transmitted to another electronic device that is distinct from the electronic device 302 is generated based on a map and a second privacy table that is distinct from the first privacy table. Alternately, the electronic device 302 may share a same privacy table with more than one device. For example, the electronic device 302 may share the same privacy table with the electronic device 304 and two other devices. In such cases, all of the devices that store the privacy table (e.g., the electronic device 302, the electronic device 304, and the two other devices) may communicate securely with one another via the secure communication process described above with respect to FIGS. 3A-3E.

FIG. 4A illustrates an example of an encrypted payload 324, according to some embodiments.

Referring to FIG. 4A, the encrypted payload 324-A (corresponding to the encrypted payload 324) includes the encrypted first message 322 and the map 312. For example, the encrypted payload 324-A is a concatenation of the encrypted first message 322 and the map 312. Values (e.g., numerical values) in the map 312 are presented in FIG. 4A by the letters "A" through "G". In some embodiments, as shown, the map 312 is prepended to the encrypted first message 322.

The map 312 is used to generate the challenge string 314, and thus includes a plurality of values that correspond to instructions or directions on how to use a privacy table to generate (or recreate) the challenge string. For example, the map 312 includes:

a random value (e.g., a numerical value) corresponding to a starting point within the privacy table, represented by the letter "A";

a value (e.g., a numerical value) corresponding to a horizontal offset from the starting point within the privacy table, represented by the letter "B";

a value (e.g., a positive or negative value) corresponding to a horizontal read direction from the starting point within the privacy table;

a value (e.g., a numerical value) corresponding to a vertical offset from the starting point within the privacy table, represented by the letter "C";

a value (e.g., a positive or negative value) corresponding to a vertical read direction from the starting point within the privacy table;

a value (e.g., a numerical value) corresponding to a size (e.g., a permutation of a size) of the privacy table in a horizontal direction, represented by the letter "D";

a value (e.g., a numerical value) corresponding to a size (e.g., a permutation of a size) of the privacy table in a vertical direction, represented by the letter "E";

a value (e.g., a numerical value) corresponding to a starting point within the privacy table (e.g., within the permutation), represented by the letter "F". The value corresponding to the starting point within the privacy table is bounded by the size of the privacy table. In some embodiments, The value corresponding to the starting point within the privacy table is generated by a pseudo-random number generator; and a length of a challenge string that is used to generate the primary key, represented by the letter "G". In some embodiments, the length of the challenge string is based on the size of the primary key (which may be, for example, 246 bits of 32 bytes in length).

In some embodiments, the random value, "A," is generated (e.g., provided) by a pseudo-random number generator. In some embodiments, the random value, "A," is selected from a set of values that are determined based on the size of the privacy table 310. For example, when the privacy table 310 is a 2-dimensional matrix having a size of 100 by 50 (e.g., "D"=100 and "E"=50) and storing a total of 5,000 values, $0 \leq A \leq 5{,}000$.

A privacy table 310 can include any number of random numbers. In some embodiments, a privacy table 310 consists of as few as 256 bits. In some embodiments, the privacy table 310 includes 10,000 random bits or more. In some embodiments, the size of the privacy table 310 is determined based on an expected use of the privacy table. For example, if the privacy table 310 has an expected use of a few seconds (e.g., as part of a process for encrypting speech between two parties), a privacy table 310 that has a small size is adequate.

For a privacy table 310 that includes 10,000 bits, generating a map 312 may include any of:

obtaining a random value "A" using a pseudo-random number generator, where $1 \leq A \leq 10{,}000$. In this example, A=2,544;

obtaining a random value "B" corresponding to a horizontal offset from the starting point within the privacy table, where 1≤B≤10,000. In some embodiments, "B" is obtained via a pseudo-random number generator;

obtaining a randomly determined direction corresponding to a horizontal read direction (e.g., a positive read direction or a negative read direction);

obtaining a random value "C" corresponding to a vertical offset from the starting point within the privacy table, where 1≤C≤10,000. In some embodiments, "C" is obtained via a pseudo-random number generator;

obtaining a randomly determined direction corresponding to a vertical read direction (e.g., a positive read direction or a negative read direction);

computing a horizontal permutation value "D", which corresponds to the size of the privacy table 310 in the horizontal direction. For example, the horizontal permutation value is determined (e.g., calculated) by permuting over all values between 1 and the size of the privacy table in the horizontal direction; and computing a vertical permutation value "E", which corresponds to the size of the privacy table 310 in the vertical direction. For example, the vertical permutation value is determined (e.g., calculated) by permuting over all values between 1 and the size of the privacy table in the vertical direction.

FIG. 4B provides an example of a live stream 360, according to some embodiments. The live stream 360 includes a plurality of encrypted payloads 410, which are sent sequentially (e.g., in order) with one another. Each encrypted payload 410 of the plurality of encrypted payloads includes a respective encrypted message 364, which corresponds to a portion of the live stream 360, and a respective map 312 (represented by the letters "A" through "G"), which corresponds to a respective primary key 316 (shown in FIG. 3E) used for the respective encrypted message 364. In some embodiments, the encrypted payloads 410 include a respective initialization vector 350 (represented by "H"), which is used in combination with the respective primary key 316 to form the respective encrypted message 364. This example shows transmission of two encrypted messages 364-1 and 364-2, which correspond to the first two messages 362-1 and 362-2 of the live stream 360 are shown. Transmission of a first payload 410-1 (e.g., an encrypted first payload 410-1) includes the first encrypted message 364-1 (e.g., "encryptedmessage1"), and a map 312-1 (e.g., an encoding/decoding map 312-1) corresponding to the first encrypted message 364-1 (e.g., "A1" through "G1," each representing numerical values as described with respect to FIG. 4A). In some embodiments, the first payload 410-1 includes an initialization vector 350-1 corresponding to the first encrypted message 364-1 (e.g., "H1"). For example, the encrypted payload 410-1 (also referred to as ciphertext) is a concatenation of the encrypted message 364-1, the map 312-1, and the optional initialization vector 350-1. In some embodiments, as shown, the map 312-1 is prepended to the encrypted first message 364-1. In some embodiments, the optional initialization vector 350-1 is appended to the encrypted first message 364-1 (e.g., the optional initialization vector 350-1 is added to the end of or after the encrypted message 364-1).

A second payload 410-2 (e.g., an encrypted second payload 410-2) that directly follows the first payload 410-1 is transmitted (and ideally, received) sequentially to transmission (and reception) of the first payload 410-1. Transmission of the second payload 410-2 includes the second encrypted message 364-2 (e.g., "encryptedmessage2"), and a map 312-2 (e.g., the encoding/decoding map 312-2) corresponding to the second encrypted message 364-2 (e.g., "A2" through "G2," each representing numerical values as described with respect to FIG. 4A). In some embodiments, the second payload 410-2 also includes an initialization vector 350-2 corresponding to the second encrypted message 364-2 (e.g., "H2"). Additional messages 364 of the live stream 360 are continually sent (and received) in this manner until the end of the live stream 360.

Thus, in some embodiments, the process of encrypting a message that is part of a live stream includes generating the initialization vector 350, generating a challenge string 314, and generating a primary key 316. An example of an initialization vector 350, if used for encrypting messages in a live stream, is "58, 148, 100, 27, 59, 184, 8, 236, 189, 24, 21, 6, 113, 162, 244, 26, 59, 72, 222, 95, 188, 247, 143, 118, 97, 168, 187, 147, 24, 153, 96, 130," an example of the challenge string 312 is "FFFBFCCFEFFADAF-FFFFBFFEFFFCEFFFF," and an example of the primary key 316 is "186, 3, 235, 211, 177, 202, 35, 167, 225, 195, 16, 151, 164, 71, 93, 47, 2, 114, 233, 26, 143, 119, 31, 103, 185, 88, 203, 62, 3, 43, 175, 85.

FIGS. 5A-5F illustrate a flow chart of a method 500 for secure communications between devices of a secure communication system 100, according to some embodiments. The method 500 is performed (502) at a first electronic device 302. The first electronic device may correspond to any of the electronic devices shown in FIG. 1A (e.g., the electronic devices 110, 120, 130, 140, or a device associated with the secure log 112) or any of the devices shown in FIG. 1B (e.g., a patient device 162, a device of the remote monitoring system 170, a device associated with the database 180, or a device 190 associated with a healthcare provider), The method 500 includes storing (510) a privacy table 310 (e.g., an entropy table) at the first electronic device 302. The privacy table 310 includes (e.g., comprises) random numbers. The method 500 also includes transmitting (520) the privacy table 310 to a second electronic device 120 over an encrypted channel. The second electronic device 120 is distinct from the first electronic device 302. The method 500 further includes receiving (530) a first message 320 for transmission to the second electronic device 120, generating (540) a map 312 based on the privacy table 310, generating (540) a primary key 316 (e.g., encryption key) based on the map 312 and the privacy table 310, and encrypting (560) the first message 320 using the primary key 316 to form an encrypted first message 322. The method 500 also includes transmitting (560) the map 312 and the encrypted first message 322 to the second electronic device 120, thereby enabling the second electronic device 120 to decrypt the encrypted first message 322 by recreating the primary key 316 based on the map 312 and the privacy table 310 (e.g., generate a recreated primary key 316'), and decrypting the encrypted first message 322 using the recreated primary key 316', forming the decrypted first message 320. An example of the secure communication between electronic devices of a secure communication system 100 is provided with respect to FIG. 3A.

In some embodiments, generating (540) the map 312 based on the privacy table 310 includes selecting (542) a location in the privacy table 310; selecting (544) a read direction (e.g., spin), and generating the map 312 based on values (e.g., bits or random numbers) stored in the privacy table 310 starting at the selected location and reading values stored in the privacy table 310 in accordance with the selected read direction. In some embodiments, the location (e.g., start location) in the privacy table 310 is randomly selected. In some embodiments, the read direction is randomly selected. In some embodiments, the location in the privacy table 310 is selected based on a value provided via a pseudo-random number generator. In some embodiments, the read direction is selected based on a value provided via a pseudo-random number generator. For example, a pseudo-random number generator may provide a pseudo-random number such as "−129," which corresponds to a starting position of 129 in the privacy table 310 and a negative read direction (e.g., read values in the privacy table 310 starting at position 129 and reading backwards (e.g., read right to left)). In another example, a pseudo-random number generator may provide a pseudo-random number such as "+8," which corresponds to a starting position of 9 in the privacy table 310 and a positive read direction (e.g., read values in the privacy table 310 starting at position 8 and reading forwards (e.g., read left to right)).

In some embodiments, generating the map 312 based on the privacy table 310 includes using a subset or a portion, less than all, of the random numbers (e.g., bits) stored in the privacy table 310 to generate the map. In some embodiments, the map does not include information (such as an identifier) regarding which privacy table it is associated with or generated from. In some embodiments, the map comprises random numbers from the privacy table 310. In some embodiments, the map includes a random value corresponding to a starting point within the privacy table 310, a value corresponding to a horizontal offset from the starting point within the privacy table 310, a value corresponding to a horizontal read direction from the starting point within the privacy table 310, a value corresponding to a vertical offset from the starting point within the privacy table 310, a value corresponding to a vertical read direction from the starting point within the privacy table 310, a value corresponding to a size (e.g., a permutation of a size) of the privacy table 310 in a horizontal direction, a value corresponding to a size (e.g., a permutation of a size) of the privacy table 310 in a vertical direction, a value corresponding to a starting point within the permutation, and/or the length of a challenge string 314 that is used to generate the primary key 316. In some embodiments, the length of the challenge string 314 is derived from the value corresponding to a permutation of the size of the privacy table 310 in a horizontal direction and the value corresponding to a permutation of the size of the privacy table 310 in a vertical direction.

In some embodiments, generating (550) a primary key 316 based on the map 312 and the privacy table 310 includes generating (552) a challenge string 314 based on the map 312 (e.g., based on values in the map 312, based on random numbers in the map 312), and applying (554) a digest function to the challenge string 314 to form the primary key 316.

In some embodiments, the privacy table 310 is transmitted (562) at a first time and the map 312 and encrypted first message 322 are transmitted at a second time subsequent to the first time.

In some embodiments, transmitting (560) the map 312 and the encrypted first message 322 from the first electronic device 302 to the second electronic device 120 includes prepending (562) the map 312 to the encrypted first message 322 to generate a payload 344 that is transmitted from the first electronic device 302 to the second electronic device 120. An example of an encrypted payload 344-A is provided with respect to FIG. 4A.

In some embodiments, the encrypted first message 364-1 is included in (e.g., as part of) a live stream 360. In such cases, the method 500 optionally includes appending an initialization vector 350-1 to the encrypted first message 364-1. An example of a live stream 360 (e.g., an encrypted live stream 360) that includes encrypted payloads 410 (e.g., encrypted payloads 410-1 and 410-2) for messages 362 (e.g., messages 362-1 and 362-2) that is part of a live stream 360 is provided with respect to FIG. 4B.

In some embodiments, the encrypted first message 364-1 and the encrypted second message 354-2 are included (590) in a live stream 360.

In some embodiments, encrypting (560) the first message 362-1 includes using (592) the primary key 316-1 and the initialization vector 350-1, to form the encrypted first message 364-1, and encrypting (562) the second message 362-2 includes using (592) the new primary key 316-2 and a new initialization vector 350-2. The electronic device 302 also transmits (594) the initialization vector 350-1 with the map 312-1 and the encrypted first message 364-1 to the second electronic device 304 (e.g., as part of the same payload, such as the payload 410-1 shown in FIG. 4B). After transmitting the initialization vector 350-1, the map 312-1, and the encrypted first message 364-1 to the second electronic device 305, the first electronic device 302 updates (596) the initialization vector 350-1 to form the new initialization vector 350-2, and transmits (598) the new initialization vector 350-2 with the new map and the encrypted second message 364-2 to the second electronic device 304. FIG. 3E illustrates a process of securely transmitting messages 362 that are part of a live stream 360.

In some embodiments, the new initialization vector 350-2 is distinct from the initialization vector 350-1. In some embodiments, the encrypted first message 364-1 and the encrypted second message 364-2 are formed using the same initialization vector (e.g., the initialization vectors 350-1 and 350-2 are the same).

In some embodiments, the method 500 further includes receiving (570), at the first electronic device 302, a second message 340 for transmission to the second electronic device 304. The method 500 generates (572) a new map 332, which is distinct from the map 312, and generates (574) a new primary key 326 (e.g., encryption key) based on the new map 332 and the privacy table 310. The new primary key 326 is distinct from the primary key 316. The method 500 further includes encrypting (576) the second message 340 using the new primary key 336 to form an encrypted second message 342, and transmitting (578) the new map 332 and the encrypted second message 342 to the second electronic device 120, thereby enabling the second electronic device 120 to decrypt the encrypted second message 342 by recreating the new primary key 326 (e.g., generating a recreated new primary key 326') based on the new map 322 and the privacy table 310 and decrypting the encrypted second message 342 using the recreated new primary key 326' to form the decrypted second message 340. An example of generating new cryptographic keys (e.g., new map 322, new challenge string 324, and new primary key 326) for a new message 340 is provided with respect to FIG. 3C.

In some embodiments, the encrypted second message 342 comprises a new privacy table 390 generated to replace the privacy table 310. In such cases, the method 500 further includes, after transmitting the new map 332 and the encrypted second message 342 to the second electronic device 120, replacing the privacy table 310 with the new privacy table 390. In some embodiments, the privacy table 310 is replaced (e.g., updated, replenished) at predefined intervals. In some embodiments, replacing the privacy table 310 includes replacing (e.g., updating, replenishing) only a subset of the privacy table 310 that has been used (e.g., that has been read). For example, in some embodiments, values (e.g., bits, random numbers) in the privacy table 310 are not reused. In such cases, at least a portion of the privacy table 310 that has been used (e.g., has been read) is updated with new values (e.g., new random numbers, new bits). An example of replacing the privacy table 30 with an updated privacy table is provided with respect to FIG. 3C.

In some embodiments, the method 500 includes generating the privacy table 310 based on random numbers provided by the random number generating system 216. In some embodiments, generating the privacy table 310 includes determining the number of required keys for a predefined period of time and determining the size of the privacy table 310 based on the number of required keys. The predefined period of time corresponds to the time interval for replacing (e.g., replenishing or updating) the privacy table. The size of the new privacy table 390 may be the same or may be different from the size of the original privacy table 310 that it is replacing (e.g., the same size if the expected needs are the same, or a different size if the expected needs are different).

In some embodiments, the first electronic device 302 is a remote sensing station (e.g., a remote monitoring system 170), the second electronic device 120 is a medical device (e.g., a patient device 162), and the encrypted first message 320 includes medical data (e.g., patient data). In some embodiments, the medical device (e.g., the patient device 162) is a device that can be worn by or implanted in a patient (e.g., it is a wearable or implantable patient device) and the medical data includes medical information associated with the patient 160. An example of a secure communication system 100 that includes a medical network 150 is provided with respect to FIG. 1B.

Figure 6A:
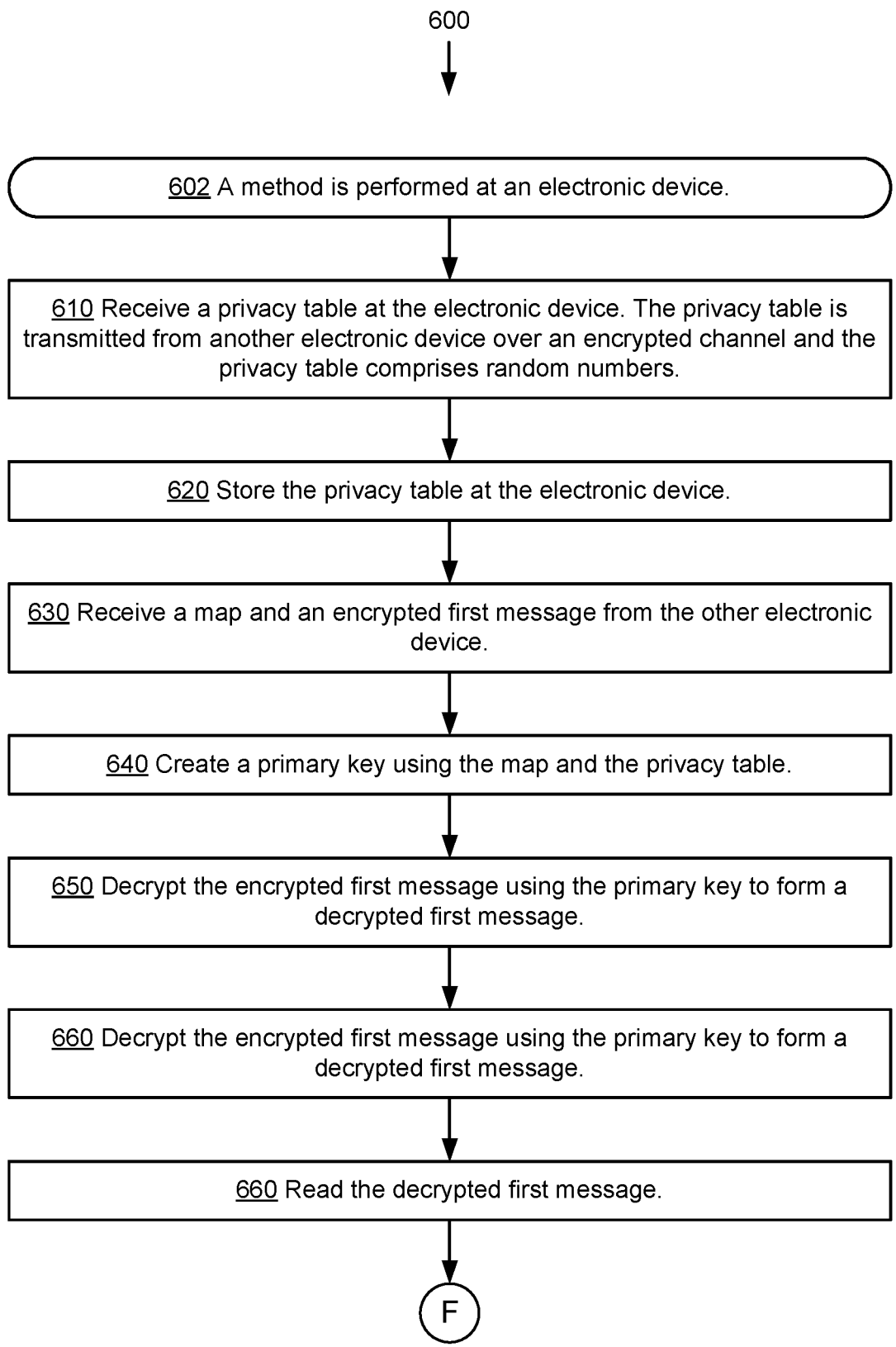
FIGS. 6A-6C illustrate a flow chart of a method for secure communications, according to some embodiments.
Figure 6B:
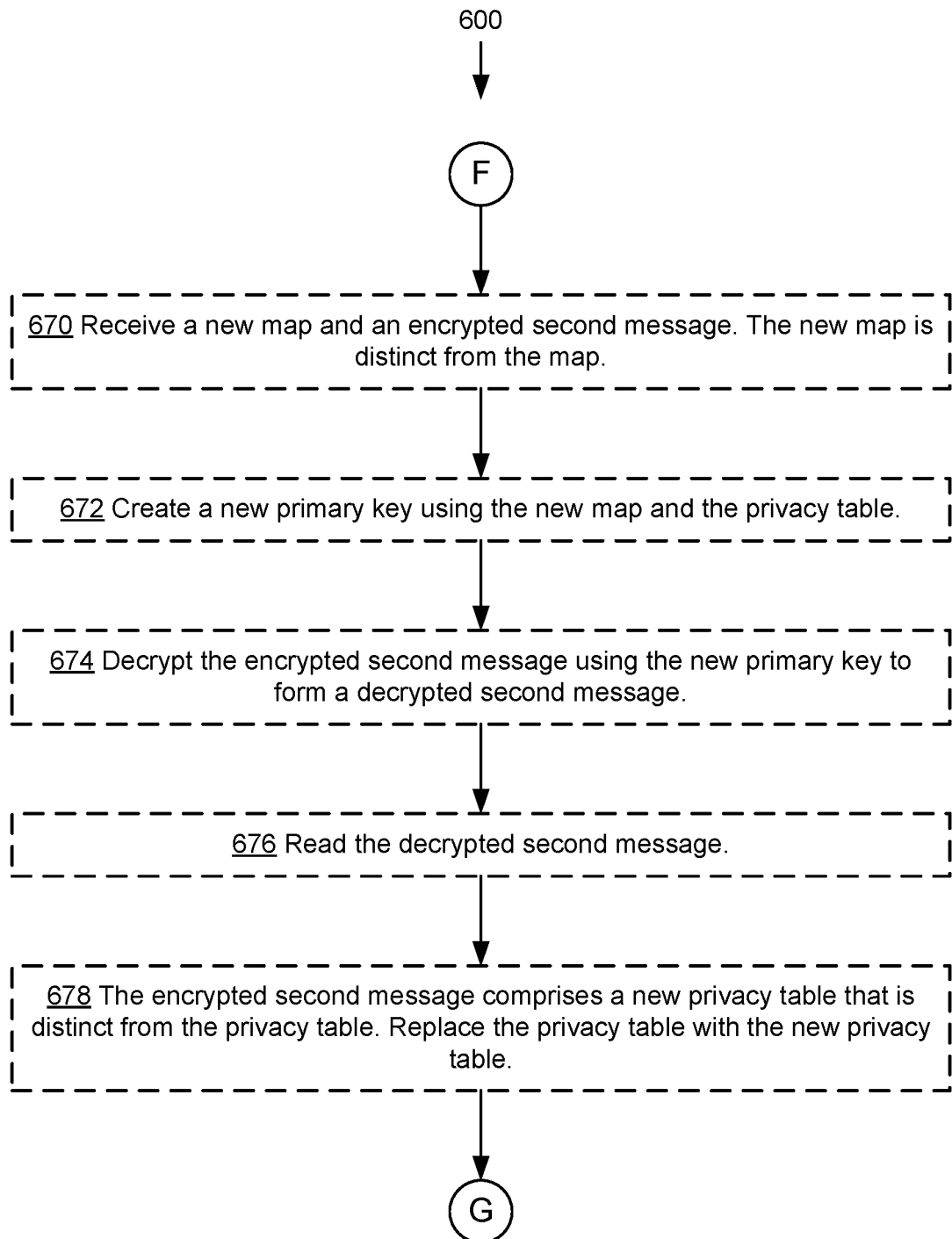
Figure 6C:
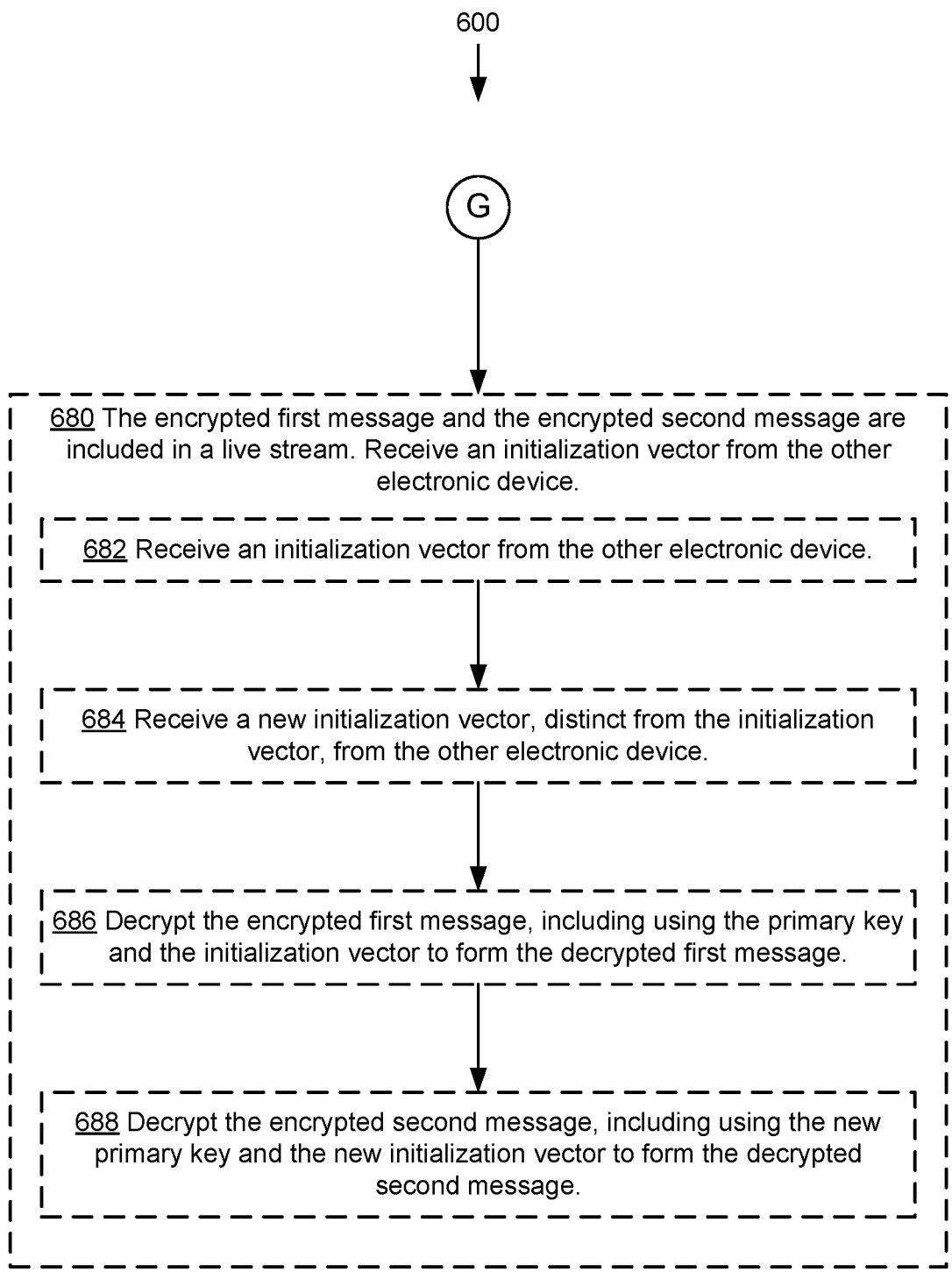

FIGS. 6A-6C illustrate a flow chart of a method 600 for secure communications between devices of a secure communication system 100, according to some embodiments. The method 600 is performed (602) at an electronic device 304. The method 600 includes receiving (610) a privacy table 310 at the electronic device 304. The privacy table 310 is transmitted from another electronic device 302 over an encrypted channel and the privacy table 310 comprises random numbers. The method 600 further includes (620) storing the privacy table 310 at the electronic device 304, receiving (630) a map 312 and an encrypted first message 322 from the other electronic device 302, creating (640) a primary key 316 (e.g., decryption key) using the map 312 and the privacy table 310, decrypting (650) the encrypted first message 322 using the primary key 316 to form a decrypted first message 320, and reading (660) the decrypted first message 320.

In some embodiments, the method 600 further includes storing the decrypted first message 320.

In some embodiments, the method 600 further includes receiving (670) a new map 332 and an encrypted second message 340. The new map 332 is distinct from the map 312. The method 600 also includes creating (670) a new primary key 334 (e.g., decryption key) using the new map 332 and the privacy table 310. The new primary key 334 is distinct from the primary key 316. The method 600 further includes decrypting (674) the encrypted second message 342 using the new primary key 326 to form a decrypted second message 340 and reading (676) the decrypted second message 340.

In some embodiments, the encrypted second message 342 comprises a new privacy table 390 that is distinct from the original privacy table 310. In such cases, the method 600 further includes, after decrypting the encrypted second message 342 using the new primary key 326 to form a decrypted second message 340, replacing (678) the privacy table 310 with the new privacy table 390.

In some embodiments, the encrypted first message 364-1 and the encrypted second message 364-2 are included (680) in a live stream 360.

In some embodiments, the method further includes receiving (682) an initialization vector 350-1 from the other electronic device 302, and receiving (684) a new initialization vector 350-2 from the other electronic device 302. Additionally, decrypting (660) the encrypted first message 364-1 includes using (686) the primary key 316-1 and the initialization vector 350-1 to form the decrypted first message 362-1, and decrypting (674) the encrypted second message 364-2 includes using (688) the new primary key 316-2 and the new initialization vector 350-2 to form the decrypted second message 364-2. An example of a process of receiving messages (e.g., encrypted messages 364) that are part of a live stream 360 (e.g., an encrypted live stream 360) is provided with respect to FIG. 3E.

In some embodiments, the new initialization vector 350-2 is distinct from the initialization vector 350-1. In some embodiments, the encrypted first message 364-1 and the encrypted second message 364-2 are decrypted to form the decrypted first message 362-1 and the decrypted second message 362-2 using the same initialization vector (e.g., the initialization vectors 350-1 and 350-2 are the same).

In some embodiments, the initialization vector 350-1 is received with (e.g., as part of the same payload as) the map 312-1 and the encrypted first message 364-1, and the new initialization vector 350-2 is received with (e.g., as part of the same payload as) the new map 312-2 and the encrypted second message 364-2. An example of a live stream 360 (e.g., an encrypted live stream 360) that includes encrypted payloads 410 (e.g., encrypted payloads 410-1 and 410-2) is provided with respect to FIG. 4B.

Thus, in various embodiments, systems and methods are described for secure electronic communications.

(A1) In some embodiments, a method is performed at an electronic device. The method comprises:

receiving a privacy table at the electronic device, wherein the privacy table is transmitted from another electronic device over an encrypted channel and the privacy table comprises random numbers;

storing the privacy table at the electronic device;

receiving a map and an encrypted first message from the other electronic device;

creating a primary key using the map and the privacy table;

decrypting the encrypted first message using the primary key to form a decrypted first message; and reading the decrypted first message.

(A2) In some embodiments of A1, the method further comprises:

receiving a new map and an encrypted second message, wherein the new map is distinct from the map;

creating a new primary key using the new map and the privacy table;

decrypting the encrypted second message using the new primary key to form a decrypted second message; and reading the decrypted second message.

(A3) In some embodiments of A1, the encrypted first message and the encrypted second message are included in a live stream.

(A4) In some embodiments of A1, the encrypted second message comprises a new privacy table that is distinct from the privacy table, and the method further comprises, after decrypting the encrypted second message using the new primary key to form a decrypted second message:

replacing the privacy table with the new privacy table.

(A5) In some embodiments of A1:
the electronic device is a medical device;
the other electronic device is a remote sensing station; and
the encrypted first message includes medical data.

(B1) In some embodiments, a computing device comprises:
one or more processors; and
memory coupled to the one or more processors, the memory storing one or more programs configured to be executed by the one or more processors, the one or more programs comprising instructions for:
receiving a privacy table at the electronic device, wherein the privacy table is transmitted from another electronic device over an encrypted channel and the privacy table comprises random numbers;
storing the privacy table at the electronic device;
receiving a map and an encrypted first message from the other electronic device;
creating a primary key using the map and the privacy table;
decrypting the encrypted first message using the primary key to form a decrypted first message; and
reading the decrypted first message.

(B2) In some embodiments of B1 the one or more programs further comprise instructions for:
receiving a new map and an encrypted second message, wherein the new map is distinct from the map;
creating a new primary key using the new map and the privacy table;
decrypting the encrypted second message using the new primary key to form a decrypted second message; and
reading the decrypted second message.

(B3) In some embodiments of B1 the encrypted first message and the encrypted second message are included in a live stream.

(B4) In some embodiments of B1 the encrypted second message comprises a new privacy table that is distinct from the privacy table. The one or more programs further comprise instructions for, after decrypting the encrypted second message using the new primary key to form a decrypted second message:
replacing the privacy table with the new privacy table.

(B5) In some embodiments of B1:
the electronic device is a medical device;
the other electronic device is a remote sensing station; and
the encrypted first message includes medical data.

(C1) In some embodiments, a non-transitory computer-readable storage medium stores one or more programs. The one or more programs comprise instructions. When the instructions are executed by a computing device, they cause the computing device to:
receive a privacy table at the electronic device, wherein the privacy table is transmitted from another electronic device over an encrypted channel and the privacy table comprises random numbers;
store the privacy table at the electronic device;
receive a map and an encrypted first message from the other electronic device;
create a primary key using the map and the privacy table;
decrypt the encrypted first message using the primary key to form a decrypted first message; and
read the decrypted first message.

(C2) In some embodiments of C1, the instructions further cause the computing device to:
receive a new map and an encrypted second message, wherein the new map is distinct from the map;
create a new primary key using the new map and the privacy table;
decrypt the encrypted second message using the new primary key to form a decrypted second message; and
read the decrypted second message.

(C3) In some embodiments of C1, the encrypted first message and the encrypted second message are included in a live stream.

(C4) In some embodiments of C1, the encrypted second message comprises a new privacy table that is distinct from the privacy table. After decrypting the encrypted second message using the new primary key to form a decrypted second message, the instructions cause the computing device to replace the privacy table with the new privacy table.

(C5) In some embodiments of C1:
the electronic device is a medical device;
the other electronic device is a remote sensing station; and
the encrypted first message includes medical data.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the scope to the precise forms disclosed. Many modifications and variations are possible in view of the above teachings. The embodiments were chosen and described in order to best explain the main principles and practical applications, to thereby enable others skilled in the art to best utilize the various embodiments and make various modifications as are suited to the particular use contemplated.

What is claimed is:

1. A method performed at a first electronic device, the method comprising:
    storing a privacy table at the first electronic device, the privacy table comprising random numbers;
    transmitting the privacy table to a second electronic device over an encrypted channel;
    receiving a first message for transmission to the second electronic device;
    selecting a location in the privacy table;
    selecting a read direction in the privacy table;
    generating a map that includes a plurality of map parameters for generating a primary key based on the map and the privacy table, wherein the map parameters specify the selected location and the selected read direction, the map parameters including two or more of:
        a value corresponding to a starting point within the privacy table;
        a value corresponding to a horizontal offset from the starting point within the privacy table;
        a value corresponding to a horizontal read direction from the starting point within the privacy table;
        a value corresponding to a vertical offset from the starting point within the privacy table;
        a value corresponding to a vertical read direction from the starting point within the privacy table;

a value corresponding to a permutation of a size of the privacy table in a horizontal direction;
a value corresponding to a permutation of a size of the privacy table in a vertical direction;
a value corresponding to a starting point within the permutation; and
a length of a challenge string that is used to generate the primary key;
generating the primary key from the privacy table according to the map parameters;
encrypting the first message using the primary key to form an encrypted first message; and
transmitting the map and the encrypted first message to the second electronic device, enabling the second electronic device to decrypt the encrypted first message by:
recreating the primary key from the privacy table according to the map parameters; and
decrypting the encrypted first message using the recreated primary key.

2. The method of claim 1, further comprising:
receiving a second message for transmission to the second electronic device;
generating a new map, which is distinct from the map;
generating a new primary key based on the new map and the privacy table, wherein the new primary key is distinct from the primary key;
encrypting the second message using the new primary key to form an encrypted second message; and
transmitting the new map and the encrypted second message to the second electronic device, enabling the second electronic device to decrypt the encrypted second message by:
recreating the new primary key based on the new map and the privacy table; and
decrypting the encrypted second message using the recreated new primary key.

3. The method of claim 2, wherein:
the encrypted first message and the encrypted second message are included in a live stream;
encrypting the first message includes using the primary key to form the encrypted first message;
encrypting the second message includes using the new primary key to form the encrypted second message; and
the method further comprises:
transmitting the map and the encrypted first message to the second electronic device; and
transmitting the new map and the encrypted second message to the second electronic device.

4. The method of claim 2, wherein the encrypted second message comprises a new privacy table generated to replace the privacy table, the method further comprising, after transmitting the new map and the encrypted second message to the second electronic device:
replacing the privacy table with the new privacy table.

5. The method of claim 1, wherein:
the privacy table is transmitted at a first time; and
the map and encrypted first message are transmitted at a second time subsequent to the first time.

6. The method of claim 1, wherein:
the first electronic device is a remote sensing station;
the second electronic device is a medical device; and
the encrypted first message includes medical data.

7. The method of claim 1, wherein transmitting the map and the encrypted first message to the second electronic device includes prepending the map to the encrypted first message to generate a payload that is transmitted from the first electronic device to the second electronic device.

8. The method of claim 1, wherein generating the primary key from the privacy table includes:
generating a challenge string based on the map; and
applying a digest function to the challenge string to form the primary key.

9. A computing device, comprising:
one or more processors; and
memory coupled to the one or more processors, the memory storing one or more programs configured to be executed by the one or more processors, the one or more programs including instructions for:
storing a privacy table at the computing device, the privacy table comprising random numbers;
transmitting the privacy table to an electronic device over an encrypted channel, wherein the electronic device is distinct from the computing device;
receiving a first message for transmission to the electronic device;
selecting a location in the privacy table;
selecting a read direction in the privacy table;
generating a map that includes a plurality of map parameters for generating a primary key based on the map and the privacy table, wherein the map parameters specify the selected location and the selected read direction, the map parameters including two or more of:
a value corresponding to a starting point within the privacy table;
a value corresponding to a horizontal offset from the starting point within the privacy table;
a value corresponding to a horizontal read direction from the starting point within the privacy table;
a value corresponding to a vertical offset from the starting point within the privacy table;
a value corresponding to a vertical read direction from the starting point within the privacy table;
a value corresponding to a permutation of a size of the privacy table in a horizontal direction;
a value corresponding to a permutation of a size of the privacy table in a vertical direction;
a value corresponding to a starting point within the permutation; and
a length of a challenge string that is used to generate the primary key;
generating the primary key from the privacy table according to the map parameters;
encrypting the first message using the primary key to form an encrypted first message; and
transmitting the map and the encrypted first message to the electronic device, enabling the electronic device to decrypt the encrypted first message by:
recreating the primary key from the privacy table according to the map parameters; and
decrypting the encrypted first message using the recreated primary key.

10. The computing device of claim 9, wherein:
the privacy table is transmitted at a first time; and
the map and encrypted first message are transmitted at a second time subsequent to the first time.

11. The computing device of claim 9, wherein transmitting the map and the encrypted first message to the electronic device includes prepending the map to the encrypted first message to generate a payload that is transmitted from the computing device to the electronic device.

12. A non-transitory computer-readable storage medium storing one or more programs configured for execution by a computing device having one or more processors and memory, the one or more programs comprising instructions for:

storing a privacy table at the computing device, the privacy table comprising random numbers;

transmitting the privacy table to an electronic device over an encrypted channel, wherein the electronic device is distinct from the computing device;

receiving a first message for transmission to the electronic device;

selecting a location in the privacy table;

selecting a read direction in the privacy table;

generating a map that includes a plurality of map parameters for generating a primary key based on the map and the privacy table, wherein the map parameters specify the selected location and the selected read direction, the map parameters including two or more of:

a value corresponding to a starting point within the privacy table;

a value corresponding to a horizontal offset from the starting point within the privacy table;

a value corresponding to a horizontal read direction from the starting point within the privacy table;

a value corresponding to a vertical offset from the starting point within the privacy table;

a value corresponding to a vertical read direction from the starting point within the privacy table;

a value corresponding to a permutation of a size of the privacy table in a horizontal direction;

a value corresponding to a permutation of a size of the privacy table in a vertical direction;

a value corresponding to a starting point within the permutation; and a length of a challenge string that is used to generate the primary key;

generating the primary key from the privacy table according to the map parameters;

encrypting the first message using the primary key to form an encrypted first message; and transmitting the map and the encrypted first message to the electronic device, enabling the electronic device to decrypt the encrypted first message by:

recreating the primary key from the privacy table according to the map parameters; and decrypting the encrypted first message using the recreated primary key.

13. The non-transitory computer-readable storage medium of claim 12, wherein:

the privacy table is transmitted at a first time; and the map and encrypted first message are transmitted at a second time subsequent to the first time.

14. The non-transitory computer-readable storage medium of claim 12, wherein transmitting the map and the encrypted first message to the electronic device includes prepending the map to the encrypted first message to generate a payload that is transmitted from the computing device to the electronic device.

* * * * *